US011763404B2

(12) United States Patent
Miller et al.

(10) Patent No.: US 11,763,404 B2
(45) Date of Patent: Sep. 19, 2023

(54) SYSTEMS, METHODS, AND APPARATUSES FOR IMPLEMENTING A GEO-DEMOGRAPHIC ZONING OPTIMIZATION ENGINE

(71) Applicant: Arizona Board of Regents on Behalf of Arizona State University, Scottsdale, AZ (US)

(72) Inventors: Jon J. Miller, Scottsdale, AZ (US); Vikash Bajaj, Tempe, AZ (US); Srinivasa Srivatsav Kandala, Chandler, AZ (US); Fangwu Wei, Tempe, AZ (US); Michael Kuby, Tempe, AZ (US); Wangshu Mu, Tempe, AZ (US); Daoqin Tong, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 17/348,292

(22) Filed: Jun. 15, 2021

(65) Prior Publication Data
US 2021/0390650 A1 Dec. 16, 2021

Related U.S. Application Data

(60) Provisional application No. 63/039,374, filed on Jun. 15, 2020.

(51) Int. Cl.
*G06Q 50/26* (2012.01)
*G06Q 10/04* (2023.01)
(Continued)

(52) U.S. Cl.
CPC ............... *G06Q 50/26* (2013.01); *G06N 5/01* (2023.01); *G06Q 10/04* (2013.01);
(Continued)

(58) Field of Classification Search
CPC .. G06Q 50/26; G06Q 10/04; G06Q 10/06313; G06Q 30/025; G06F 3/0482; G06N 5/003
See application file for complete search history.

(56) References Cited

U.S. PATENT DOCUMENTS

2002/0107918 A1* 8/2002 Shaffer ................... G10L 15/22
704/E15.047
2003/0112235 A1* 6/2003 Grace .................. G09B 29/006
345/419
(Continued)

FOREIGN PATENT DOCUMENTS

| CN | 113256011 A | * | 8/2021 |
| KR | 200357095 Y1 | * | 4/2004 |
| KR | 20110126085 A | * | 10/2011 |

OTHER PUBLICATIONS

King et al. "Data Analysis and Simulation: Optimizing Voter Wait Times" (2016) (https://kingcatherine.github.io/files/optimizing-voter-wait-times.pdf) (Year: 2016).*

(Continued)

*Primary Examiner* — Sujay Koneru
(74) *Attorney, Agent, or Firm* — Elliott, Ostrander & Preston, P.C.

(57) ABSTRACT

Systems, methods, and apparatuses for implementing a geo-demographic zoning optimization engine are disclosed. According to an exemplary embodiment, there is a system executing at a web platform, in which the system includes: a memory to store instructions; a set of one or more processors; a non-transitory machine-readable storage medium that provides instructions that, when executed by the set of one or more processors, the instructions stored in the memory are configurable to cause the system to perform operations for designing sectioned mappings for a geo-demographic region, the operations including: executing instructions via the processor to implement a receive inter- (Continued)

face at the web platform; exposing the receive interface to users of the web platform; receiving, at the receive interface, geographic information system (GIS) data defining a plurality of district boundary spatial layers for a plurality of land parcels representing districts located at least partially within the geo-demographic region; creating a plurality of zones by overlapping the plurality of district boundary spatial layers; combining separate subsets of the plurality of zones into temporary exclusive regions; optimizing a number of precincts for each of the temporary exclusive regions by combining two or more of the temporary exclusive regions into a number of precincts; in which the optimizing comprises executing an algorithm based on hierarchical objectives configured to minimize splitting precincts that contain more than one district of any type, subject to user-selected input parameters operating as constraints; and generating a design plan map with optimized number, shape, size, and boundaries defining every precinct of the design plan map outputted from the web platform to a user interface. Other related embodiments are disclosed.

20 Claims, 12 Drawing Sheets

(51) Int. Cl.
  *G06F 3/04842* (2022.01)
  *G06Q 30/0204* (2023.01)
  *G06Q 10/0631* (2023.01)
  *G06N 5/01* (2023.01)
(52) U.S. Cl.
  CPC ... *G06Q 10/06313* (2013.01); *G06Q 30/0205* (2013.01); *G06F 3/04842* (2013.01)

(56) References Cited

U.S. PATENT DOCUMENTS

| | | | |
|---|---|---|---|
| 2004/0149825 A1* | 8/2004 | Griffin | G07C 13/00 235/386 |
| 2006/0206372 A1* | 9/2006 | Carpenter | G06Q 30/02 705/7.34 |
| 2008/0177555 A1 | 7/2008 | Peterson et al. | |
| 2008/0221978 A1* | 9/2008 | Samuel | G06Q 30/02 707/999.107 |
| 2008/0227077 A1* | 9/2008 | Thrall | G09B 7/02 434/322 |
| 2009/0019373 A1 | 1/2009 | Abhyanker | |
| 2010/0064246 A1* | 3/2010 | Gluck | G06Q 50/26 715/779 |
| 2012/0323992 A1* | 12/2012 | Brobst | G09B 29/003 709/203 |
| 2013/0055309 A1* | 2/2013 | Dittus | G06Q 30/0269 725/35 |
| 2014/0222515 A1* | 8/2014 | Cordery | G06Q 30/0205 705/7.34 |
| 2015/0019294 A1* | 1/2015 | Milton | G06Q 30/0205 705/7.34 |
| 2015/0199699 A1* | 7/2015 | Milton | H04W 4/029 705/7.34 |
| 2016/0247175 A1* | 8/2016 | Milton | H04W 4/029 |
| 2016/0299639 A1* | 10/2016 | Adams | H04L 51/52 |
| 2017/0185922 A1* | 6/2017 | Lange | G06N 5/003 |
| 2018/0342030 A1 | 11/2018 | Magleby et al. | |
| 2021/0390650 A1* | 12/2021 | Miller | G06Q 10/06313 |

OTHER PUBLICATIONS

Advisory Action for U.S. Appl. No. 16/054,749, dated Sep. 13, 2019, 4 pages.

Altman, M., et al., "Public Participation GIS: The Case of Redistricting," Forthcoming Proceedings of the 47th Annual Hawaii International Conference on System Sciences, Computer Society Press, (2014), 10 pages.

Articola, P., "4 Tips for Overcoming 'Abstract Idea' Rejection," Law360, 2016, 3 pages, retrieved from https://www.lexology.com/library/detail.aspx?g=bcdbaff4-9920-47ce-a56f-5d8693897b51 on Apr. 4, 2023.

Bennett, K., et al., "Building a Custom GIS-Based Precincting and Redistricting System," 2005 ESRI International User Conference Paper UC 1138, (Jul. 28, 2005), 27 pages.

Bettinelli, A., et al., "A branch and price algorithm for the variable size bin packing problem with minimum filling constraint," Annals of Operations Research, vol. 179, No. 1, (Sep. 2010), pp. 221-241.

Bradlee, D., et al., "Dave's Redistricting," http://gardow.com/davebradlee/redistricting/launchapp.html, (accessed Feb. 15, 2019), 1 page.

Dierenfeldt-Troy, S., "The Enfish Decision: Some Light at the End of the Tunnel for Software Patents Since Alice?," IPWatchdog, 2016, 9 pages, retrieved from https://ipwatchdog.com/2016/06/09/enfish-decision-light-end- tunnel-software-patents-since-alice/id=69733/ on Apr. 4, 2023.

Final Office Action for U.S. Appl. No. 16/054,749, dated May 30, 2019, 24 pages.

Graham, R.L., et al., "Concrete Mathematics: A foundation for Computer Science, 2nd Edition," Addison-Wesley Publishing Company, (1994), pp. 67-101.

Hall, C., "Testing a Patent Claim against an Abstract Idea, in Response to 35 USC §101 Rejection," IPWatchdog, 2017, 5 pages, retrieved from https://ipwatchdog.com/2017/08/16/testing-patent-claim-abstract-idea-response-35-usc-§101-rejection/id=86881/ on Apr. 4, 2023.

Helbig, R., et al., "Political Redistricting by Computer," Communications of the ACM, vol. 15, No. 8, (Aug. 1974), pp. 735-741.

Mann, K., "Building a GIS-Based Election Support System," esri. com, http://www.esri.com/news/arcuser/1207/ electionsupport. html, (Oct.- Dec. 2007), 4 pages.

Miller, J., et al., ASU Decision Theater Network, Arizona State University, Election Officials of Arizona Workshop (Apr. 12, 2018), 11 pages.

Non-Final Office Action for U.S. Appl. No. 16/054,749, dated Dec. 3, 2018, 54 pages.

Olson, B.,"BDistricting-About," BDistricting, archived on Feb. 7, 2016, https://web.archive.org/web/20160207031928/https://bdistricting.com/about.html (2016), 4 pages.

Shumaker, S. et al., "Specific Improvements to Computer-related Technology Are Not Abstract Under Alice 101 Framework," 2016, 5 pages, retrieved from https://web.archive.org/web/20201022043341/https://www.ssiplaw.com/specific-improvements-to-computer-related-technology-are-not-abstract-under-alice-101-framework/ on Apr. 4, 2023.

Stein, M., "Major 101 Decision—*Enfish* v. *Microsoft*," IP Intelligence, 2016, 4 pages, retrieved from https://www.ipintelligencereport.com/2016/05/12/major-101-decision-enfish-v-microsoft/ on Apr. 4, 2023.

Voting Precinct Design Tool: Resource Optimization for Election Administrators, ASU Decision Theater Network, Arizona State University (2017), 5 pages.

* cited by examiner

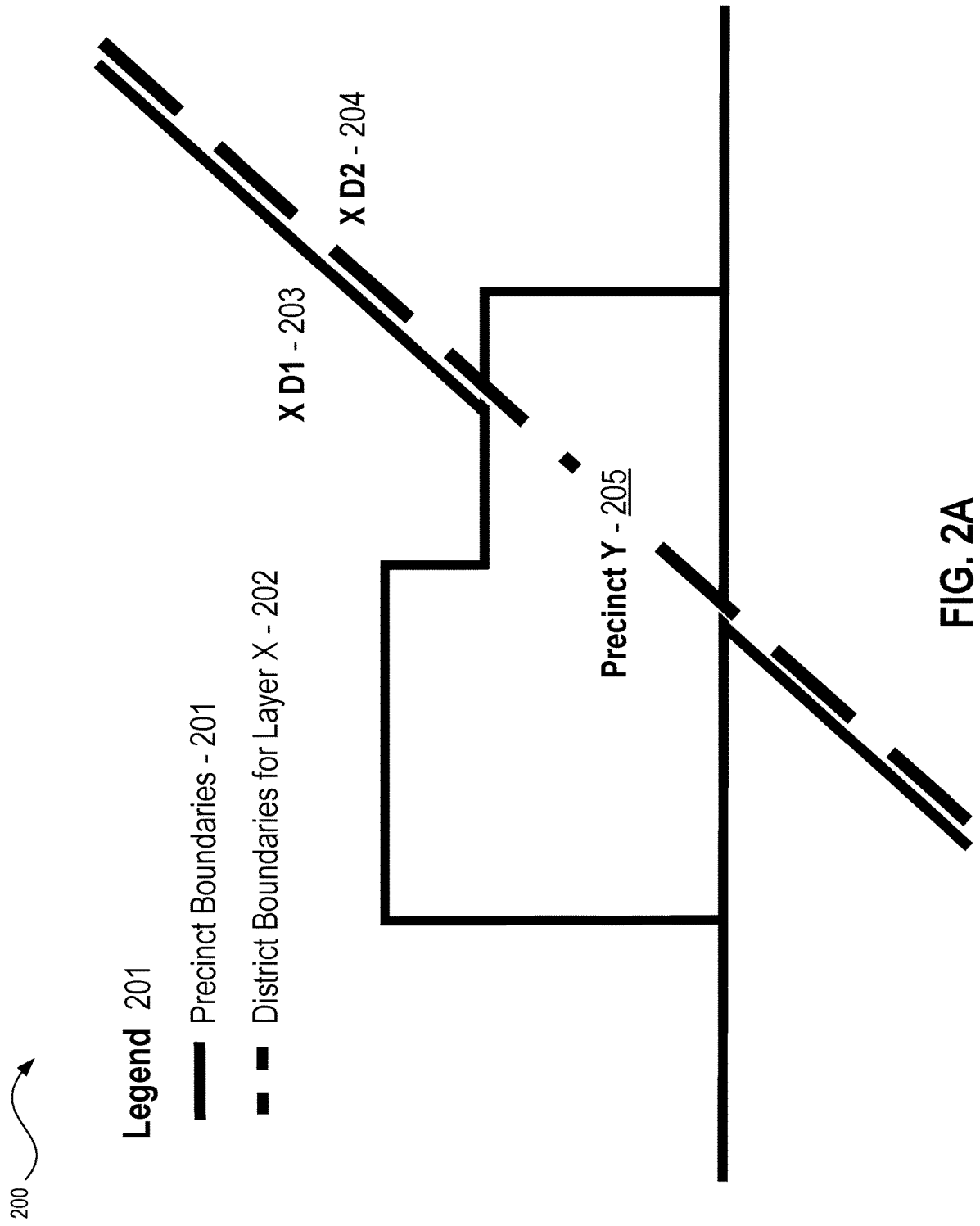

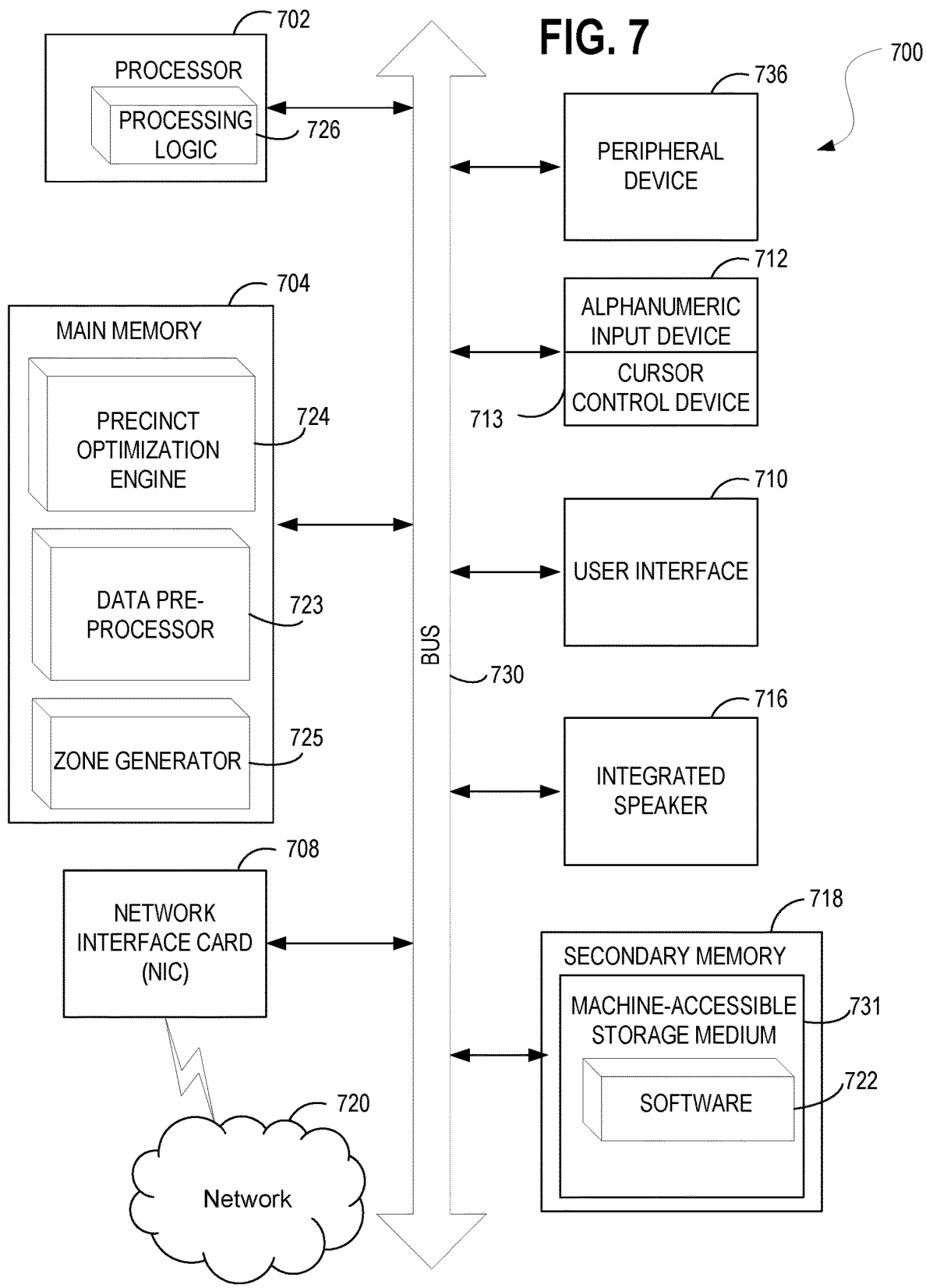

SYSTEMS, METHODS, AND APPARATUSES FOR IMPLEMENTING A GEO-DEMOGRAPHIC ZONING OPTIMIZATION ENGINE

CLAIM OF PRIORITY

This non-provisional U.S. Utility patent application is related to, and claims priority to, the U.S. provisional patent application No. 63/039,374, filed Jun. 15, 2020, entitled "METHOD AND APPARATUS FOR VOTER PRECINCT OPTIMIZATION,", the entire contents of which are incorporated herein by reference.

GOVERNMENT RIGHTS AND GOVERNMENT AGENCY SUPPORT NOTICE

Not applicable.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of Geographic Information System (GIS) mapping software, and in particular to systems, methods, and apparatuses for implementing a geo-demographic zoning optimization engine, for example in designing electoral precincts.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Commonly employed techniques for precinct design lack sophistication and do not take full advantage of information technology tools. In smaller counties, precinct maps are often created by hand, on paper, in a boardroom or central office. In geographically larger and/or more populous counties, professional staff members are employed to design precincts using commercial, off-the-shelf Geographic Information System (GIS) software such as ArcGIS.

Even with GIS software, precinct design is a lengthy, resource-intensive, trial-and-error process that is inherently inefficient while yielding a multitude of errors. In order to create precincts, GIS technicians must overlay a variety of geographic layers (e.g., congressional districts, legislative boundaries, school districts, sanitary districts, etc.) while at the same time mentally balancing competing legal and sensitive local considerations that are subject to constant change. The typical approach requires highly skilled GIS technicians possessing both technical proficiency and institutional knowledge of the local nuances governing election administration, federal laws, and the continually shifting socio-political landscapes. Today's most advanced processes and results are far less than optimal while being plagued with human error and limited by educated guess-work.

Problematically, the advent of GIS software has not fundamentally changed the precinct design process, as boundaries are still created by humans via digital means, and thus are still subject to human bias and error. This results in flawed precincts and sub-optimal resource allocations, as well as the danger of continuing historical abuse of such mapping tools that propagate societal inequities as a result of, for example, gerrymandering.

A solution to the problem is therefore necessitated for optimized and representative geo-social mapping zones that can be used for statistical, electoral, and other purposes.

The state of the art may therefore benefit from the systems, methods, and apparatuses for implementing a geo-demographic zoning optimization engine, as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A depicts an exemplary representation of a split in a precinct by the geo-demographic zoning optimization engine, in accordance with described embodiments;

FIG. 7 illustrates a diagrammatic representation of a machine in the exemplary form of a computer system, in accordance with one embodiment.

DETAILED DESCRIPTION

Described herein are systems, methods, and apparatuses for implementing a geo-demographic zoning optimization engine. According to an exemplary embodiment, there is a system executing at a web platform, in which the system includes: a memory to store instructions; a set of one or more processors; a non-transitory machine-readable storage medium that provides instructions that, when executed by the set of one or more processors, the instructions stored in the memory are configurable to cause the system to perform operations for designing sectioned mappings for a geo-demographic region, the operations including: executing instructions via the processor to implement a receive interface at the web platform; exposing the receive interface to users of the web platform; receiving, at the receive interface, geographic information system (GIS) data defining a plurality of district boundary spatial layers for a plurality of land parcels representing districts located at least partially within the geo-demographic region; creating a plurality of zones by overlapping the plurality of district boundary spatial layers; combining separate subsets of the plurality of zones into temporary exclusive regions; optimizing a number of precincts for each of the temporary exclusive regions by combining two or more of the temporary exclusive regions into a number of precincts; in which the optimizing comprises executing an algorithm based on hierarchical objectives configured to minimize splitting precincts that contain more than one district of any type, subject to user-selected input parameters operating as constraints; and generating a design plan map with optimized number, shape, size, and boundaries defining every precinct of the design plan map outputted from the web platform to a user interface.

Figure 1:
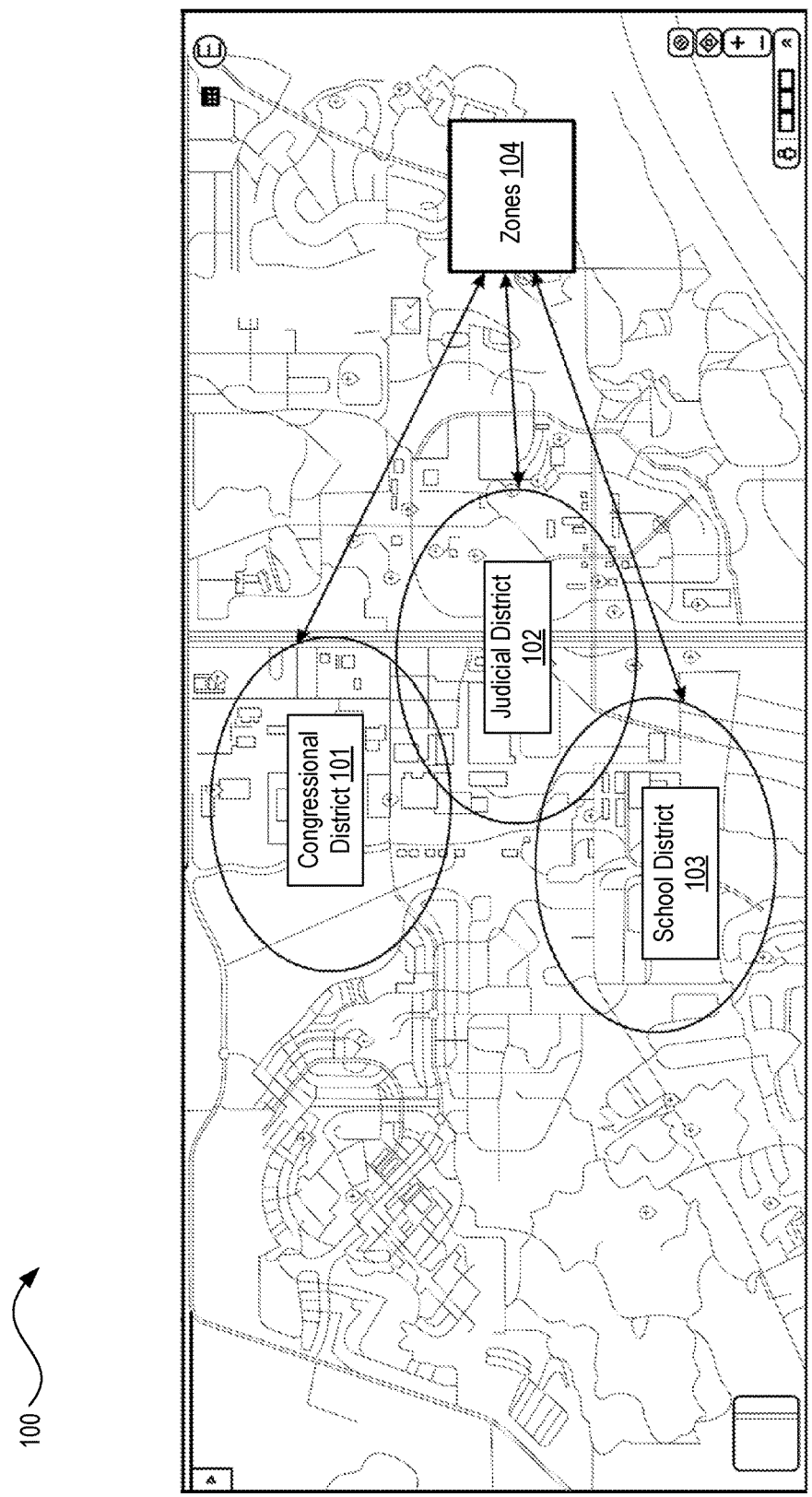
FIG. 1 depicts an exemplary interface implementing the geo-demographic zoning optimization engine, in accordance with described embodiments.

FIG. 1 depicts an exemplary interface 100 implementing the geo-demographic zoning optimization engine, in accordance with described embodiments.

Government officials are responsible for administering and conducting elections subdivide regions such as counties, townships, or boroughs into voting precincts with residential addresses assigned to specific precincts. When subdividing regions into precincts, officials typically consider numerous factors. For example, precincts should not contain too many or too few voters and should be geographically compact and contiguous. Officials prepare and provide ballots to voters, whether in person or by mail, identifying positions, candidates, propositions, or other matters requiring voter consideration based on residential addresses. Ideally, the entire precinct should be able to use the same ballot design (i.e., the list of races, candidates, and propositions should not vary within a precinct). Balancing these constraints, election officials strive to gain efficiency and conserve resources by optimizing the boundaries and number of required precincts, minimizing ballot design and printing variance, and streamlining required election support equipment and staffing.

As shown here, the geo-demographic zoning optimization engine is a decision-making and resource-management platform ("PrecinctPro") that automates and optimizes the precinct design process through a web-based interface 100.

Election officials input data related to the number and locations of voters as well as multiple map layers of the various districts for which elections are held. These districts include congressional and legislative districts, municipalities, school districts, special taxing districts, judicial districts, etc. Based on parameters specified by the user, the geo-demographic zoning optimization engine, according to embodiments of the invention, automatically performs mapping design, defined to include generating or outputting maps and map design plans using a multi-objective optimization algorithm executed by a computing system. These outputs may include, for example, maps of suggested optimal precincts outputted for viewing on a web-based browser or as a downloadable spatial file. The novel algorithm is not capable of being performed manually, due to the exponentially large number of possible solutions to the problem.

The geo-demographic zoning optimization engine, according to embodiments, leverages an optimization algorithm to automate and improve upon the precinct design process. Users identify and rank the design criteria most important in their design decision priorities. The tool allows election administrators to simulate multiple polling scenarios and choose the optimal precinct design for allocating resources or meeting other decision criteria. The result is a transparent design process that yields a mathematically optimized solution influenced exclusively by the rank order of the specifically selected design criteria. The mathematically derived, geographically visualized solution expedites the decision-making process by creating greater stakeholder buy-in via immediate understanding and elimination of concerns over undue designer bias. The inherent flexibility of the tool and ease in adapting to new or evolving local, regional, or statewide districting considerations allows the elections' administrators to respond to changing conditions with unprecedented ease. The end-to-end nature of the tool enables agencies responsible for voting administration, no matter their size or level of technical expertise, to easily implement, adapt, and scale the tool in place of complicated, disjointed workflows that in some instances require expensive expert consultants.

Interface 100 may be specially configured for a target region, county, or other geographic subdivision. According to certain embodiments, geographic subdivisions 101-103 including Congressional District 101, Judicial District 102, and School District 103 may be pre-configured boundary spatial layers representing parcels of land or areas of interest. These geographic subdivisions may be combined or overlayed to form zones such as zone 104. Zones such as zone 104 are also known as No-Split Zones (NSZs) further discussed in FIG. 4D. Zones such as zone 104 may also be known as precincts in their final, optimized form. According to certain embodiments, zone 104 may be further combined with other zones to form temporary exclusive regions, which are then optimized by a geo-demographic zoning optimization engine based on user-selected input parameters to output precincts. User-selected input parameters may come from, for example, a County Recorder's Office or urban planning officials and may also take into consideration demographic, electoral, and local governance factors such as legal requirements, travel distance for voters, and ballot printing and tabulation costs. According to certain embodiments, user-selected input parameters may also include geographic subdivisions such as geographic subdivisions 101-103, as well as other GIS data defining boundary spatial layers. According to yet other embodiments, user-selected input parameters may include user provided inputs 330 available in a menu associated with interface 100. User provided inputs 330 may include, for example: (i) the maximum number of Non-Permanent Early Voting List (PEVL) voters 332 (e.g., default value: 1,500), (ii) the maximum number of voters in a precinct 331 (e.g., default value: 4,500), (iii) the desired "weights" for precinct compactness and avoiding optional no-crossing splits, and (iv) split/no split categorization of district layers.

For certain types of districts, no precincts can legally include more than one district, i.e., the entire precinct must be represented by a single state legislator or congressional representative. For other types of districts, it is possible to include two such districts in a single precinct, where there may be two versions of a ballot with candidates for two different School Superintendent races. This is not desirable because any such split within a precinct usually requires different ballots to be designed, printed, and administered for different subsections of the precinct, which adds substantial costs to conducting elections. For these optional types of districts, the geo-demographic zoning optimization engine, according to embodiments, allows user input to designate districts of which no more than one can be represented in a precinct and others that are permitted to contain a variety of splits only if necessary. Therefore, based on user inputs, the tool recognizes three different types of voting district map layers:

Always Mandatory No-split (No-share). Congressional and legislative districts are designated as No-share. For legal reasons, these districts cannot be split, i.e., two or more districts cannot exist in the same precinct—only one such district can exist within each precinct. Districts may span multiple precincts, but precincts cannot span multiple districts.

Optional No-split (Optional No-share). User input may optionally designate a map layer of districts as no-split for a particular scenario. The geo-demographic zoning optimization engine will treat these layers the same as mandatory no-split layers for the purposes of optimization. Embodiments will then enforce this rule for all such layers.

Other (Sharing allowed). For all other map layers, embodiments of the invention attempt to minimize the number of splits but will allow splits if necessary. For these map layers, two or more districts may exist within a given precinct, if needed, required, or as appropriate.

Thus, the three different "no-split" categories described above classify layers based on whether multiple districts are permitted to exist in any single precinct. While congressional and legislative districts cannot be split to share a precinct, regulation allows other layers (e.g., school and sanitary districts) to be split to share a precinct at the discretion of the user.

FIG. 2A depicts an exemplary representation of a split in a precinct by the geo-demographic zoning optimization engine 200, in accordance with described embodiments.

As shown here, Precinct Y 205 is split between two districts X D1—203 and X D2—204 at layer X. Precinct boundaries 201 and district boundaries for layer X—202 are depicted as two lines diagonally intersecting Precinct Y. According to certain embodiments, precinct boundaries 201 and district boundaries for layer X—202 may overlap, or according to certain embodiments, an intermediary sliver zone may exist between precinct boundaries 201 and district boundaries for layer X—202. Such splits are not allowed for districts categorized or classified as always mandatory no-split (no share). For other layers, however, a user can choose whether splits are allowed ("Optional no-split") or minimized and/or discouraged ("Other").

Figure 2B:
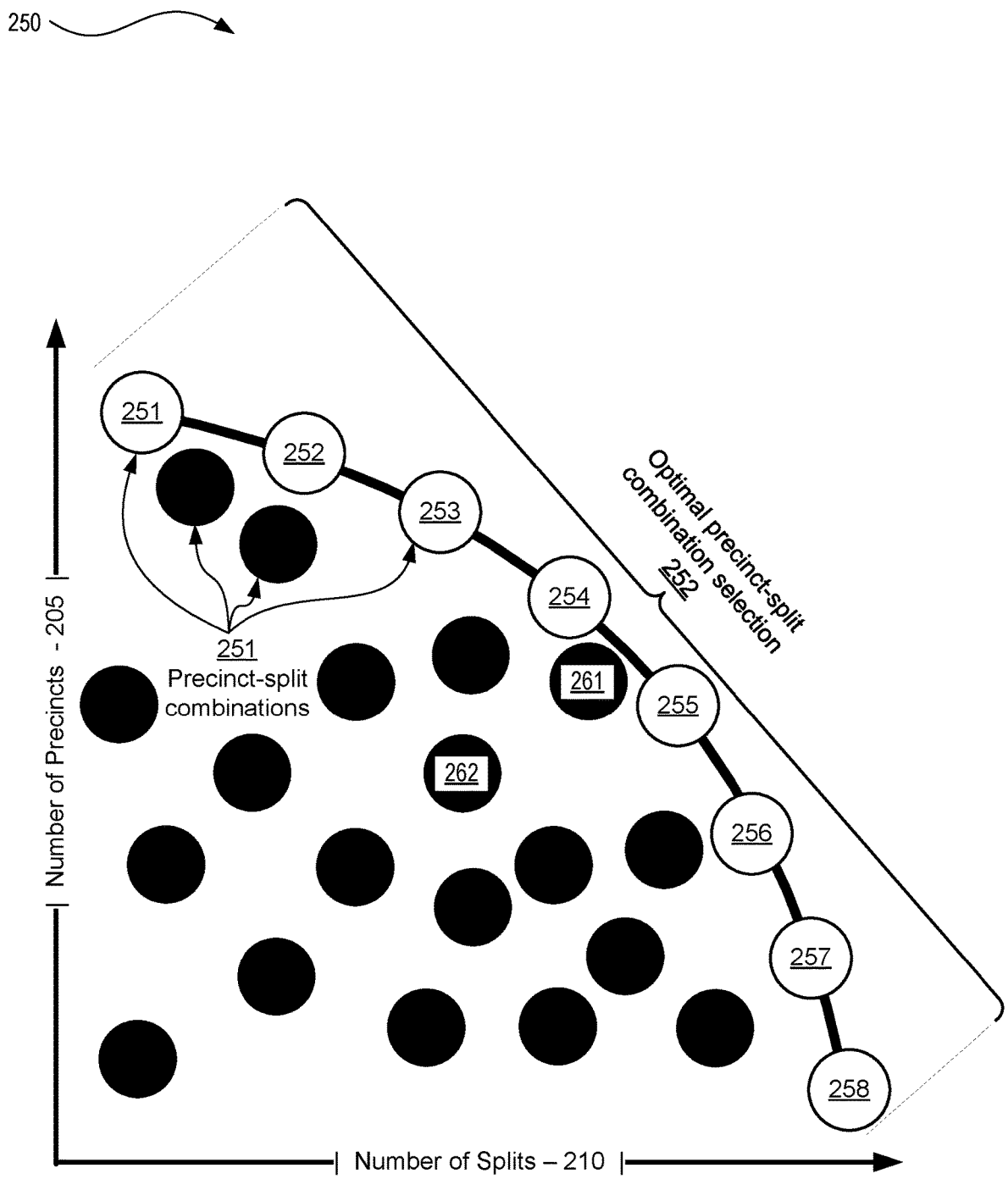
FIG. 2B depicts an exemplary graph highlighting an optimal precinct-split combination selection from among various scenarios based on user-selected inputs, in accordance with described embodiments.

FIG. 2B depicts an exemplary graph highlighting an optimal precinct-split combination selection from among various scenarios based on user-selected inputs 250, in accordance with described embodiments.

The geo-demographic zoning optimization engine provides solutions to human-drawn guesstimates of zone/precinct mapping by automating the process following user-selected input parameters, and moving beyond minimally acceptable solutions to optimize zone/precinct mapping based on user-selected input parameters defining target characteristics for zones/precincts.

As shown here, geo-demographic zoning optimization engine plots various scenarios or combinations (precinct-split combinations 251) based on a vertical axis representing a possible number of precincts 205 and a horizontal axis representing a possible number of splits 210 for sectioning a target geographic region such as districts 101-103. Certain precinct-split combinations 251 such as precinct-split combination 262 and 261 may be sub-optimal or produced under traditional methods such as hand mapping of precincts in an office by GIS technicians or with commercial, off-the-shelf GIS software. In contrast, the geo-demographic zoning optimization engine offers automated optimal precinct-split combination selection 252, in accordance with user-input selection parameters including target characteristics for precinct/zone mapping.

Optimal precinct-split combination selection 252 is the product of the geo-demographic zoning optimization engine balancing several objectives with user-defined priorities. Based on user-determined constraints and inputs, a multi-objective optimization algorithm generates optimal precinct-split combination selections 252 comprising optimally-mapped precincts based on the following guiding principles: (i) minimizing the total number of precincts (thus reducing the number of different versions of ballots to be printed, and reducing other associated costs), (ii) minimizing total voter-weighted travel distance within precincts (thereby creating smaller and more compact precincts and providing greater access to voting), and (iii) minimizing the number of splits in precincts containing more than one district of any type that allow for the option of being divided.

The three guiding principles described above are optimized while further ensuring that each precinct is spatially contiguous, always-mandatory no-split districts (e.g., congressional and legislative) and user-specified mandatory no-split spatial districts cannot be divided within any precinct, and that the number of voters in a precinct never exceeds the maximum allowed.

The above described embodiment leverages an optimization algorithm to both minimize splits within districts and maximize district compactness, while also ensuring that the maximum number of voters per precinct specified by the user is not exceeded and mandatory spatial districts (e.g., congressional and legislative) are not divided within any precinct. Since user-selected input parameters are always honored, human error is reduced. This provides election administrators with an unprecedented ability to run various scenarios and employ strategies aimed at optimizing available resources.

According to one embodiment of the invention, the geo-demographic zoning optimization utilizes a heuristic solution algorithm consistent with two procedures: (1) data preprocessing and (2) optimization to solve the precinct-design problem (i.e. generating an optimal precinct-split combination selection from among various scenarios based on user-selected inputs 250), a problem which is exponentially too large to solve manually.

The number of possible solutions to the precinct design problem can be estimated using Stirling numbers of the second kind. A Stirling number of the second kind is the number of ways to partition a set of n elements into k nonempty subsets. In this case, n represents the number of building-block aerial units to be grouped into precincts and k represents the number of precincts to create. A Stirling number of the second kind is appropriate here because the number of building-block units per precinct can vary. The formula for the Stirling number of the second kind is as follows:

$$S_n^{(k)} = \frac{1}{k!} \sum_{i=0}^{k} (-1)^i \binom{k}{i} (k-i)^n.$$

For example, for a medium-sized US county with 5,000 building-block units and 200 precincts, the number of possible partitions will be more than $1.79*10^{11130}$. Then, for each possible partition, the procedure needs to check for contiguity and objective function values. Even for the most powerful computers available, processing all these partitions alone would take more than hundreds of years. In addition, given that the minimum possible number of precincts is not known in advance, these solutions would need to be enumerated manually for multiple k values, further increasing the number of partitions.

The exemplary graph of FIG. 2B highlights an optimal precinct-split combination selection from among various scenarios based on user-selected inputs 250 also allows for analyzing tradeoffs between the number of precincts 205 created, the number of district splits 210 introduced, and the compactness of the precincts. This embodiment generates tradeoff curves such as optimal precinct-split combination selection 252 to improve the understanding of conflicting objectives and enhance the ability to prioritize certain objectives and find solutions.

Figure 3A:
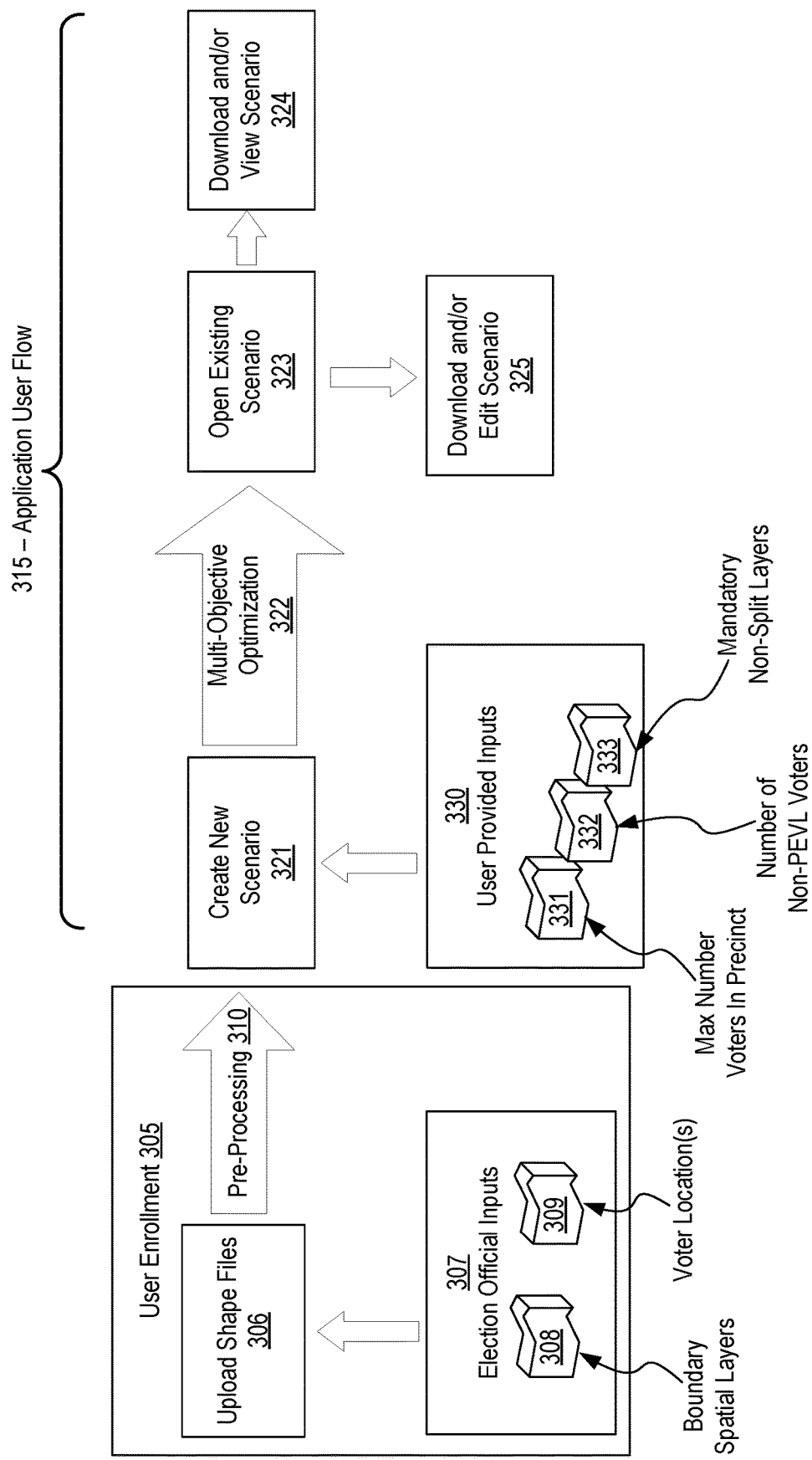
FIG. 3A depicts exemplary user enrollment and application user flow of the geo-demographic zoning optimization engine, in accordance with described embodiments.

FIG. 3A depicts exemplary user enrollment 305 and application user flow 315 of the geo-demographic zoning optimization engine, in accordance with described embodiments.

As shown here, user enrollment 305 begins by geo-demographic zoning optimization engine receiving election official inputs 307 comprising boundary spatial layers 308 and voter location(s) 309. Shape files are also uploaded 306 to define target geographic regions for sectioning and mapping and include, for example, a .zip file including required spatial layers (representing legislative districts, congressional districts, voter locations, etc.), or optional spatial layers (representing school districts, special taxing districts, etc.). With such basic pre-configured inputs received, the geo-demographic zoning optimization engine begins data pre-processing 310. According to certain embodiments, a project setting file (e.g., a text file) that provides naming schemes for layers names and associated column names in a single output file may also be uploaded.

In addition, data preprocessing 310 requires a spatial layer of census polygons, such as census blocks, that may be uploaded as shape files 306. Census blocks are the smallest unit the U.S. Census Bureau uses to summarize population information. Census blocks are also the building blocks that have been used to draw the boundaries of political districts. These layers will ultimately become the map upon which the optimization process 322 is performed. All of the spatial layers are clipped along those boundaries of the area of optimization (e.g., the county for county elections administrations), so as to focus only on the areas of those layers within the desired area of optimization.

Data preprocessing 310 is used to create valid building blocks, also referred to herein as no-split zones (NSZs), from which feasible precincts are assembled. NSZs are contiguous groups of land parcels (properties), all of which must fall into the same individual districts for all possible types of districts. Each NSZ, by definition, will contain no more than one district of any type. For example, all parcels within an NSZ must vote in the same congressional district, the same legislative district, the same school district, and so on. The creation of NSZs uses all three types of layers: always mandatory no-split precincts, user-specified mandatory no-split precincts, and optional no-split precincts. By grouping all similar and contiguous parcels together in no-split zones, the optimization can be performed with many fewer decision variables, which radically speeds the computation. For example, for a large county such as Maricopa County, Ariz., there are 3925 NSZs. To make smaller, more flexibly combinable building blocks, the preprocessing further subdivides the NSZs by census blocks, which increases the number to 73,047. This number of building blocks is still $\frac{1}{22}$ of the total number of land parcels in the county, which would be the finest-grained building blocks.

By grouping land parcels into NSZs, the preprocessing procedure greatly reduces the computational burden for the genetic algorithm in the solution procedure. It also converts a geographic problem into a purely mathematical problem, thus eliminating the need for the solution algorithm to call any GIS operations, which would be much slower than mathematical operations.

Data preprocessing 310 requires identifying all types of districts in the county or township, identifying the boundaries for the districts of each type, and then identifying the NSZs: the contiguous groups of land parcels or properties that fit within areas that are defined by no more than one district of any type.

No NSZ is allowed to be larger than a census block. According to the embodiments, all voting district layers are overlaid on the spatial layer of census blocks. Any part of a census block that resides only in one district for each kind of political district, i.e., that contains no voting district boundaries of any kind, is made into its own NSZ. It is possible that an entire census block could be a single NSZ if there are no voting district boundaries of any kind within the block. This spatial layer of NSZs is then connected to the shapefile containing the voter location data to produce a single spatial layer of NSZs with voter data as a shapefile Following data pre-processing 310, application user flow 315 commences with create new scenario 321. Creating new scenario 321 involves receiving user provided inputs 330 to specify, for example, the maximum number of voters in precinct 331, the number of non-PEVL voters 221, and mandatory non-split layers 333.

Figure 3B:
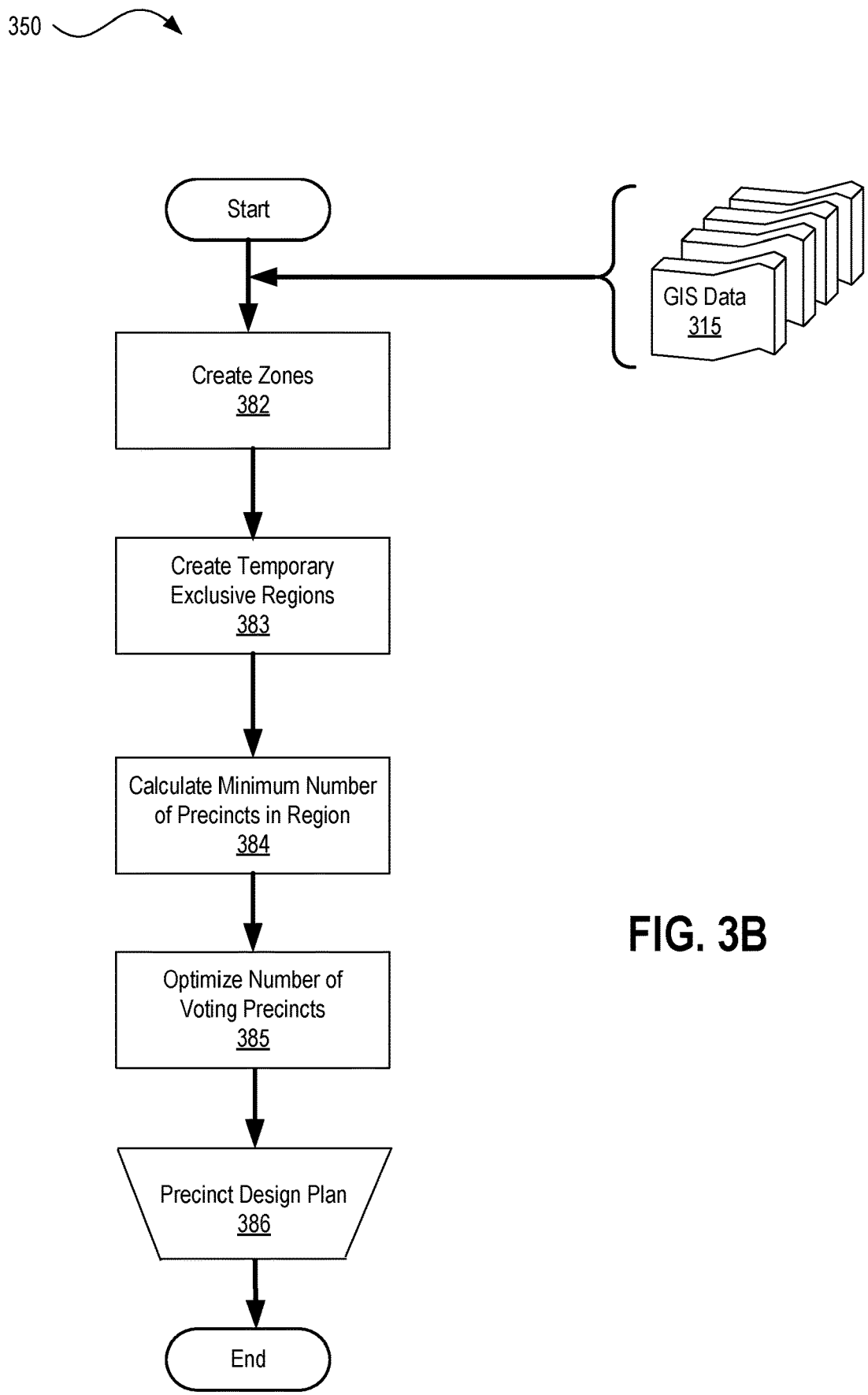
FIG. 3B depicts an exemplary flow diagram illustrating step-wise operations executed by the geo-demographic zoning optimization engine to generate precinct design plans, in accordance with described embodiments.
Figure 3C:
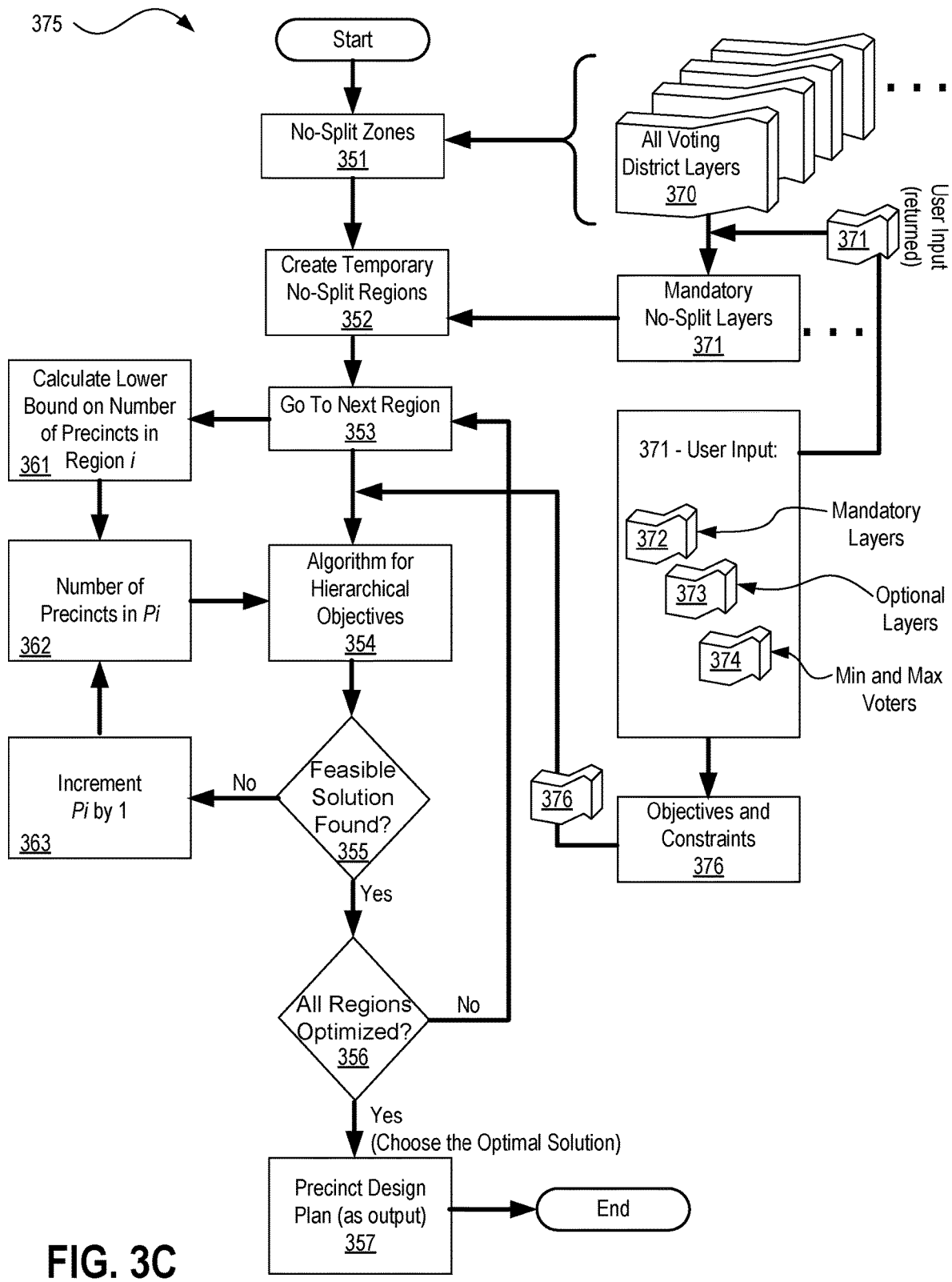
FIG. 3C depicts an exemplary flow diagram illustrating the process of precinct optimization by the geo-demographic zoning optimization engine.

Once create new scenario 321 is executed by the geo-demographic zoning optimization engine, multi-objective optimization 322 is performed, as will be further discussed in FIG. 3C. Following multi-objective optimization 322, existing scenarios may be opened 323 and further downloaded and/or viewed 324 or downloaded and/or edited 325.

Interactive Mode.

According to certain embodiments, interface 100 of the geo-demographic zoning optimization engine allows for an interactive editing mode, wherein existing maps may be loaded 323 from the memory of the geo-demographic zoning optimization engine. From there, existing boundaries may be edited 325, a new precinct created from selected NSZs, or a selected portion of the map may be re-optimized.

Precinct Boundary Editing.

In interactive mode, the user can select one or more contiguous NSZ on the border of two precincts and then assign them to the neighboring precinct. If the NSZs cannot be assigned to any other precinct, interface 100 will report an error.

Creating a New Precinct from Selected NSZs.

The user can also select one or more contiguous NSZs within a single precinct and then create a new precinct from those. If the NSZs selected are not contiguous or would cause the original precinct to no longer be contiguous, interface 100 will report an error.

Partial Re-Optimization.

Multiple connected precincts may be selected from interface 100 and have algorithm 354 applied to them in order to re-optimize those specific precincts. According to certain embodiments, objectives and constraints 376 may involve user input 371 to select the weights for compactness and no-crossing for algorithm 354. The geo-demographic zoning optimization engine will return the same number of precincts after re-optimization that were selected to perform re-optimization on.

FIG. 3B depicts an exemplary flow diagram illustrating step-wise operations executed by the geo-demographic zoning optimization engine to generate precinct design plans, in accordance with described embodiments.

As shown here GIS data 315 containing data, for example in the form of shapefiles, is received by the geo-demographic zoning optimization engine, and pursuant to mapping operations that will be described in FIGS. 4A-4D, zones are created 382, and from these zones, temporary exclusive regions 383 are created. Following this, the minimum number of precincts in a region are calculated 384, in order to optimize the number of voting precincts 385, and generate a precinct design plan 386.

Optimization.

FIG. 3C depicts an exemplary flow diagram illustrating the process of precinct optimization 375 by the geo-demographic zoning optimization engine.

Precinct optimization follows a combination of inputs received by the geo-demographic zoning optimization engine, including all voting district layers 370, which may include Congressional Districts (CD) 496 and Judicial Districts (JD) 497, and user input (returned) 371, which as previously discussed may involve parameters defining mandatory layers 372, optional layers 373, and min and max voters 374. According to certain embodiments, precinct optimization is based on no-split zones 351, which are mapped zones based on spatial intersections of all voting district layers 370, as will be described in FIGS. 4A-4D.

Step 1. Create Temporary No-Split Regions.

The first step of precinct optimization is a pre-aggregation of NSZs to create temporary no-split regions 352 based on mandatory no-split layers 371 (which are comprised of Always Mandatory No-split and User-Defined Mandatory No-split layers only, ignoring Optional No-split layers selected by the user). In these temporary no-split regions, no mandatory no-split district crosses any of the region's boundaries. The term "region" is used here to imply a geographic aggregation comprised of one or more zones. These regions are also referred to as "temporary" to imply they are a stepping stone towards a final precinct map, but are not present in final precinct maps.

Because the geo-demographic zoning optimization engine prioritizes minimizing the number of precincts over the other criteria (such as maximizing compactness and minimizing the number of optional splits), no NSZ from one region is combined with an NSZ from a different region, because doing so would create a precinct containing a split of a mandatory no-split district. Therefore, the rest of the algorithm can be performed one region at a time, by going to the next region at block 353.

Step 2. Calculate Lower Bound on the Number of Precincts in a Region.

The precinct optimization process 375 continues with calculating a lower bound on the number of precincts in each region 361 based on the total number of voters ($M_i$), the total number of non-permanent early voting list (non-PEVL) voters ($N_i$) in each region, the maximum number of voters ($m_{max}$), and the maximum number of non-PEVL voters ($n_{max}$) specified by the user. Equation (1) computes the theoretical minimal number of precincts for region i($p_i^{min}$) as:

$$p_i^{min} = \left\lceil \max\left(\frac{M_i}{m_{max}}, \frac{N_i}{n_{max}}\right) \right\rceil \quad (1)$$

Step 3. Minimizing the Number of Precincts in a Region.

An algorithm for hierarchical objectives 354 may be used in one embodiment to optimize the precinct design within a temporary region, one temporary region at a time. This is a novel use of optimization algorithm in electoral precinct design. Additionally, algorithm 354 uses uniquely developed sub-methods for the algorithm and, according to certain embodiments, may receive objectives and constraints 376 based on user input 371. The algorithm first involves initializing the number of precincts in region i($p_i$) 362 as $p_i = p_i^{min}$. For the current $p_i$, the algorithm then attempts to combine NSZs in the temporary region into $p_i$ contiguous precincts to optimize two hierarchical objectives, the first hierarchical objective being to minimize the number of Optional No-split districts that need to be split.

This objective is achieved by minimizing the ratio of unique boundaries within precinct ($R_i^{(B)}$):

$$\text{Min } R_i^{(B)} = \frac{\sum_{j=1}^{p_i} B_{ij}^{(in)}}{B_i} \quad (2)$$

In Equation (2), $p_i$ is the number of precincts in region i, $B_i$ is the total number of unique boundaries in region i, and $B_{i,j}^{(in)}$ is the number of unique boundaries that are contained by each precinct j. The value of the ratio ($R_i^{(B)}$) is between 0 and 1. When ($R_i^{(B)}$) is close to 0, the precincts are less likely to cross non-mandatory districts.

The second hierarchical objective to be optimized is maximizing the compactness of each precinct.

The compactness is operationalized through the ratio of minimum sum of distance ($R_i^{(C)}$), $$\text{Min } R_i^{(C)} = \frac{\sum_{j=1}^{n_i} \sum_{k=1}^{m_{i,j}} D(k, m_j)}{\sum_{j=1}^{n_i} m_{i,j}} \quad (3)$$
$$\sum_{k=1}^{} D(k, M_i)$$

In Equation (3), $m_{i,j}$ is the number of non-split zones in precinct j, region i, and $D(k, m_j)$ is the distance from NSZ k to the median center of precinct j ($m_j$). The median center is the location with the minimum distance to all NSZs in precinct j. $D(k, M_i)$ is the distance from NSZ k to the median center of the region i ($M_i$). The value of the ratio $R_i^{(C)}$ is between 0 and 1. When $R_i^{(C)}$ is close to 0, the precincts are relatively more compact.

Because both ratios are between 0 and 1, they can be compared directly. In one embodiment, the algorithm allows users to determine the priority of importance of either factor by inputting custom weights for both parameters. In the objective function, $W_{cpt}$ represents the priority weight given to compactness and $W_{nc}$ represents the weight given to less crossing of boundaries across optional NSZs. The geo-demographic zoning optimization engine, according to embodiments, sets both of these weights to 50 percent by default. The multi-criteria objective function (4) therefore is:

$$\text{Objective} = \frac{W_{cpt}}{W_{cpt} + W_{nc}} * R_i^{(C)} + \frac{W_{nc}}{W_{cpt} + W_{nc}} * R_i^{(B)} \quad (4)$$

Algorithm 354 is then run for region i to minimize (4) subject to the following constraints 376: (i) the region is divided into $p_i$ precincts, (ii) each precinct constructed should be spatially contiguous the number of voters in each precinct should not exceed $m_{max}$, and (iii) the number of non-PEVL voters in each precinct should not exceed $n_{max}$.

Step 4. Termination and Feasibility Check

Algorithm 354 for region i terminates when no improvement in Equation (4) can be found or the algorithm reaches the maximum amount of iteration steps. If no obtained solutions are feasible 355 based on the specified constraints, $p_i$ is increased by 1-363, and algorithm 354 repeats with the new $p_i$, until it finds at least one feasible solution. The optimal division of region i into precincts is the one that creates the smallest number of precincts, with any ties broken by selecting the division that minimizes Equation (4). This set of precinct polygons and their various attributes is added to the final map of precincts.

Step 5. Iteration Over all Temporary No-Split Regions

Pursuant to having determined a feasible solution 355, algorithm 354 determines when all regions have been optimized 356. If all regions have not been optimized, algorithm 354 moves to the next region i 353 and repeats Steps 2 to 4. When all regions have been subdivided into precincts, the algorithm chooses the optimal solution and stops, outputting precinct design plan 357.

Post-Processing.

Post-processing is the next step of producing finished maps and outputting precinct design plan 357. After a map has been optimizing or re-optimized 356, the geo-demographic zoning optimization engine will first dissolve the NSZs according to the results of the previous steps 351-355, in order to generate precincts 357 and save it as a type of GIS file, for example, a GeoJSON file. Then, it will calculate statistics for each precinct (e.g., voter numbers, the different districts it resides in, etc.), each region (e.g. min/max voters, compactness, etc.), and for the entire county (e.g. min/max voters, compactness, etc.).

Adding New Precincts.

Users can choose to add precincts after optimization. The geo-demographic zoning optimization engine, according to embodiments, will automatically distribute the extra precincts to the appropriate regions so that the compactness and no-crossing from Equation (4) are minimized.

Assuming each exclusive region has $p_i$ precincts after the initial optimization algorithm, and the total number of precincts is P, the procedure of adding n precincts to the original plan will be conducted as follows:

Step 1. Try to add 1 precinct to each exclusive region. Currently, each exclusive region will have $p_i+1$ precincts.

Step 2. Select the exclusive region with the maximum reduction of the objective value. Add one precinct to this exclusive region. Restore all other exclusive regions. Currently, the precinct design should have P+1 precincts in total.

Step 3. Start with the precinct design in Step 2 and repeat, until the total number of precincts achieve P+n.

Figure 4B:
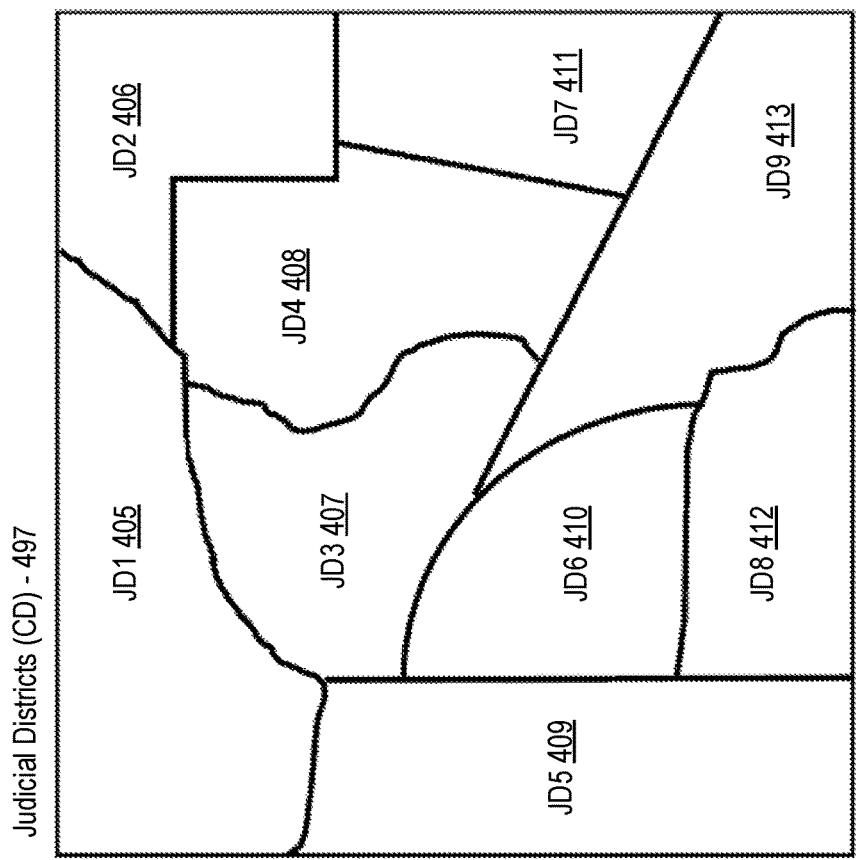
FIG. 4B depicts an exemplary hypothetical division of a region into Judicial Districts, in accordance with described embodiments.
Figure 4A:
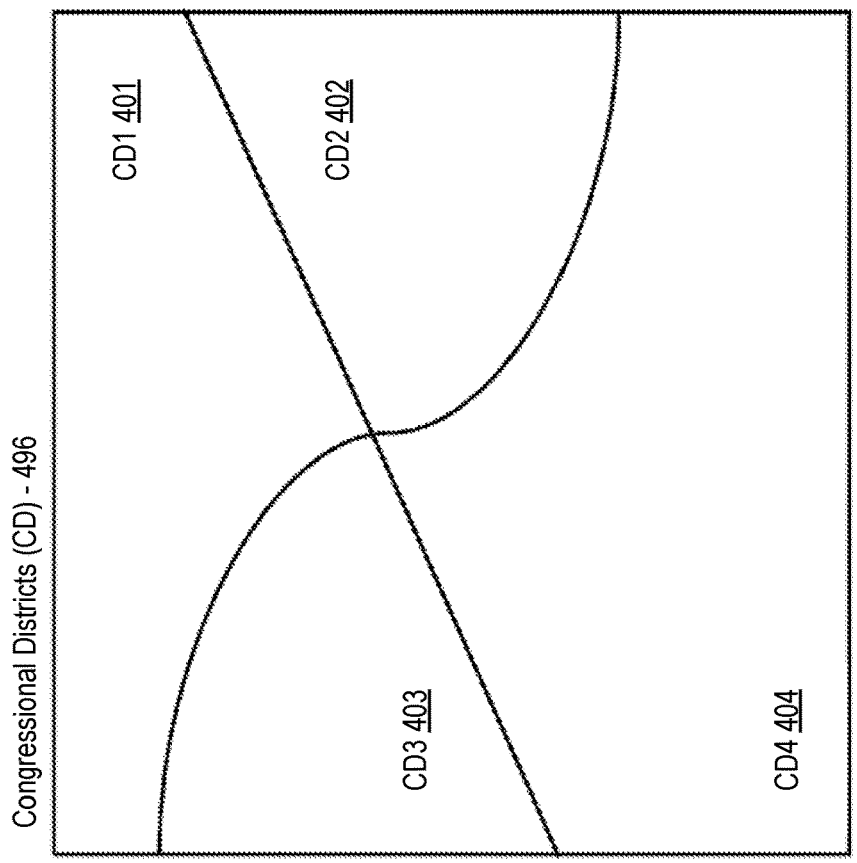
FIG. 4A depicts an exemplary hypothetical division of a region into Congressional Districts, in accordance with described embodiments.

FIG. 4A depicts an exemplary hypothetical division of a region into Congressional Districts, in accordance with described embodiments.

As shown here, a geographic region may be sectioned into "Congressional Districts (CD)" 496, for example four CDs including: CD1—401, CD2—402, CD3—403, and CD4—404.

FIG. 4B depicts an exemplary hypothetical division of a region into "Judicial Districts, in accordance with described embodiments.

As shown here, a geographic region may be sectioned into "Judicial Districts (JD)," 497, for example nine JDs including: JD1—405, JD2—406, JD3—407, and JD4—405, JD5—406, JD6—410, JD7—411, JD8—412, and JD9—413.

According to certain embodiments, Congressional Districts (CD) 496 and Judicial Districts (JD) 497 may be pre-configured and received by the geo-demographic zoning optimization engine as, for example, uploaded shape files 306.

No-Split Zones (NSZs).

Figure 4D:
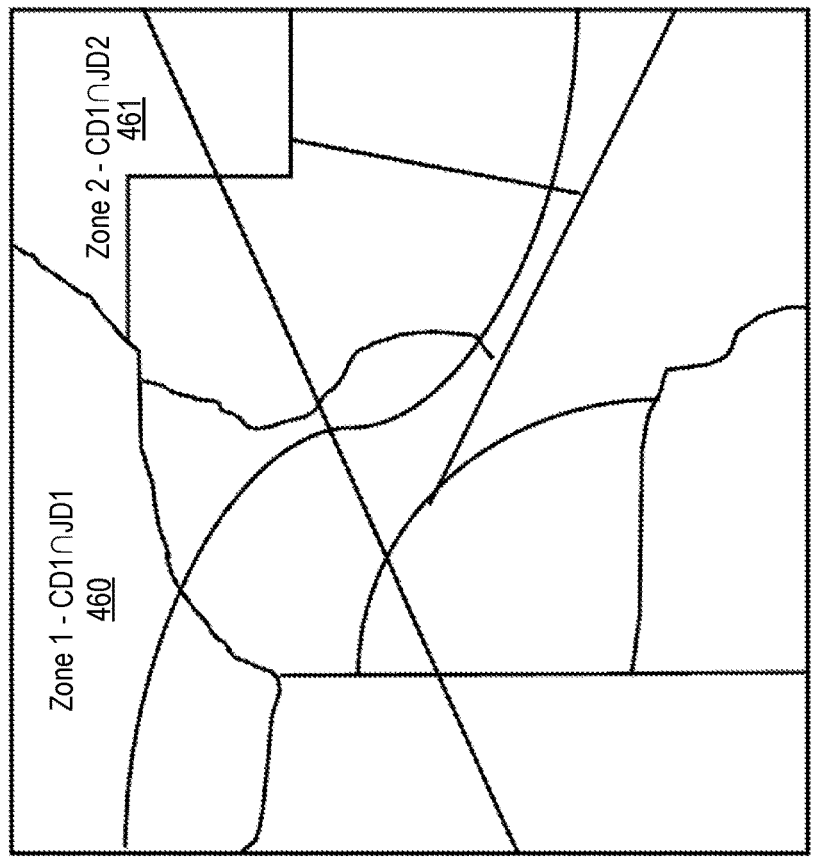
FIG. 4D illustrates the mapping of No-Split Zones (NSZ) from FIGS. 4A-4C, respectively, in accordance with described embodiment.
Figure 4C:
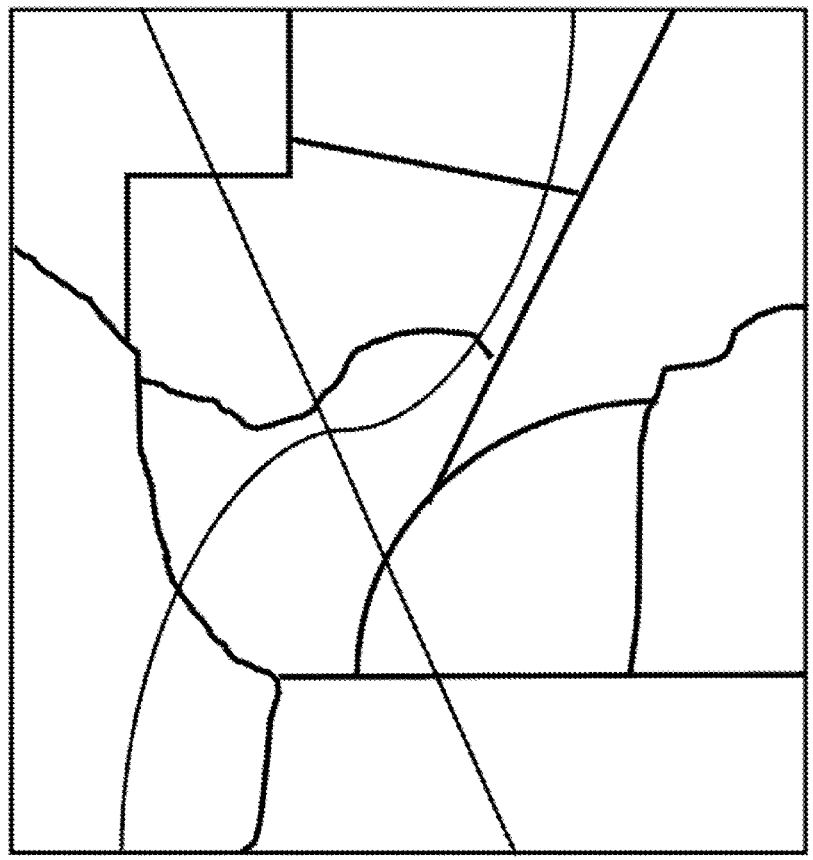
FIG. 4C illustrates an overlay of the Congressional Districts and Judicial Districts from FIGS. 4A and 4B, respectively, in accordance with described embodiments.

FIG. 4C illustrates an overlay of the Congressional Districts and Judicial Districts from FIGS. 4A and 4B, respectively, in accordance with described embodiments According to set theory, the intersection of two sets is a subset including members of both sets. For instance, {A,B, C}∩{C,D}={C}. A GIS operation known as spatial intersection is based on this concept but operates differently. The spatial intersection operation can overlay multiple sets of polygons and find all areas of overlap. Each unique area overlapping the exact same set of districts is defined as a new polygon. As shown here, nineteen unique areas of spatial overlap are formed into new polygons, specifically Combined Districts (CD+JD) 498. The boundaries of Combined Districts (CD+JD) 498 do not line up and intersect with each other to form new polygons. The new polygons can include attribute data from the original polygons.

FIG. 4D illustrates the mapping of No-Split Zones (NSZ) from FIGS. 4A-4C, respectively, in accordance with described embodiments.

As shown, here Combined Districts (CD+JD) 498 from FIG. 4C have been labeled as No-Split Zones 499 such as Zone 1—CD1∩JD1—460, indicating the overlap of CD1—401 and JD1—405, as well as Zone 2—CD1∩JD2 461, indicating the overlap of CD1—401 and JD2—406.

By definition, no NSZ can contain a split between two districts of the same type. For example, Zone 1—CD1∩JD1—460 has all of its territory in both CD1—401 and JD1—405, and none of its territory contains any other CD—496 or JD—497 and therefore it also does not contain any CD or JD splits.

Sliver Elimination.

When various district maps are overlaid as seen in FIG. 4C, there may be dozens to hundreds of inconsistencies in boundaries between various maps. For example, a legislative district map may place the boundary between two districts along the median of a highway whereas a municipal map may place its boundary between two cities along the exit ramp of the highway. The result is a "sliver" that may be a few yards wide, miles long, and contain no voters within its boundary. These slivers can negatively impact the optimization process, forcing election administration officials using previous solutions to perform this data clean-up by hand.

The geo-demographic zoning optimization engine, according to embodiments, uses a process that automates this data cleaning, improving the speed at which it can be done by orders of magnitude. The geo-demographic zoning optimization engine processes census block by census block, identifying any NSZ with no voters to be a "sliver," then grouping slivers and non-slivers into a table, and further groups every NSZ into one of four categories depending upon the number of slivers within the census block. Each group has a separate process applied to it.

If there is only one NSZ with a voter count greater than 0, all NSZs within that census block will be categorized as "group one" and all slivers are merged with the NSZ within the census block that has a voter count greater than 0.

If, within one census block, two or more NSZs have a voter count greater than 0, all NSZs within the block will be categorized as "group two." Within each block the process will go sliver by sliver, temporarily merging the sliver with each of its neighboring NSZs, calculating its compactness, and performing a permanent merge based on the temporary merge that has the most compactness.

If there are no NSZs within a census block that have a voter count greater than zero all NSZs will be categorized as "group three" and merged into a single NSZ comprising the entire census block.

If all NSZs within a census block have a voter count greater than zero, all NSZs are categorized as "group 4" and no further action is taken at the census block level. These processes are performed iteratively until there are no slivers in any census block.

If the NSZs generated in the above steps are too large for assembly into a precinct, these building blocks will need to be further subdivided. NSZs can be subdivided to any desired level to create smaller building blocks. The smaller the building blocks, the more flexible the optimization, but also the slower the computation, generally speaking. With smaller building blocks, the algorithm is able to combine building blocks in more ways to achieve precincts with voter totals closer to the maximum number of voters and will also be able to construct precincts that are more compact.

Figure 5A:
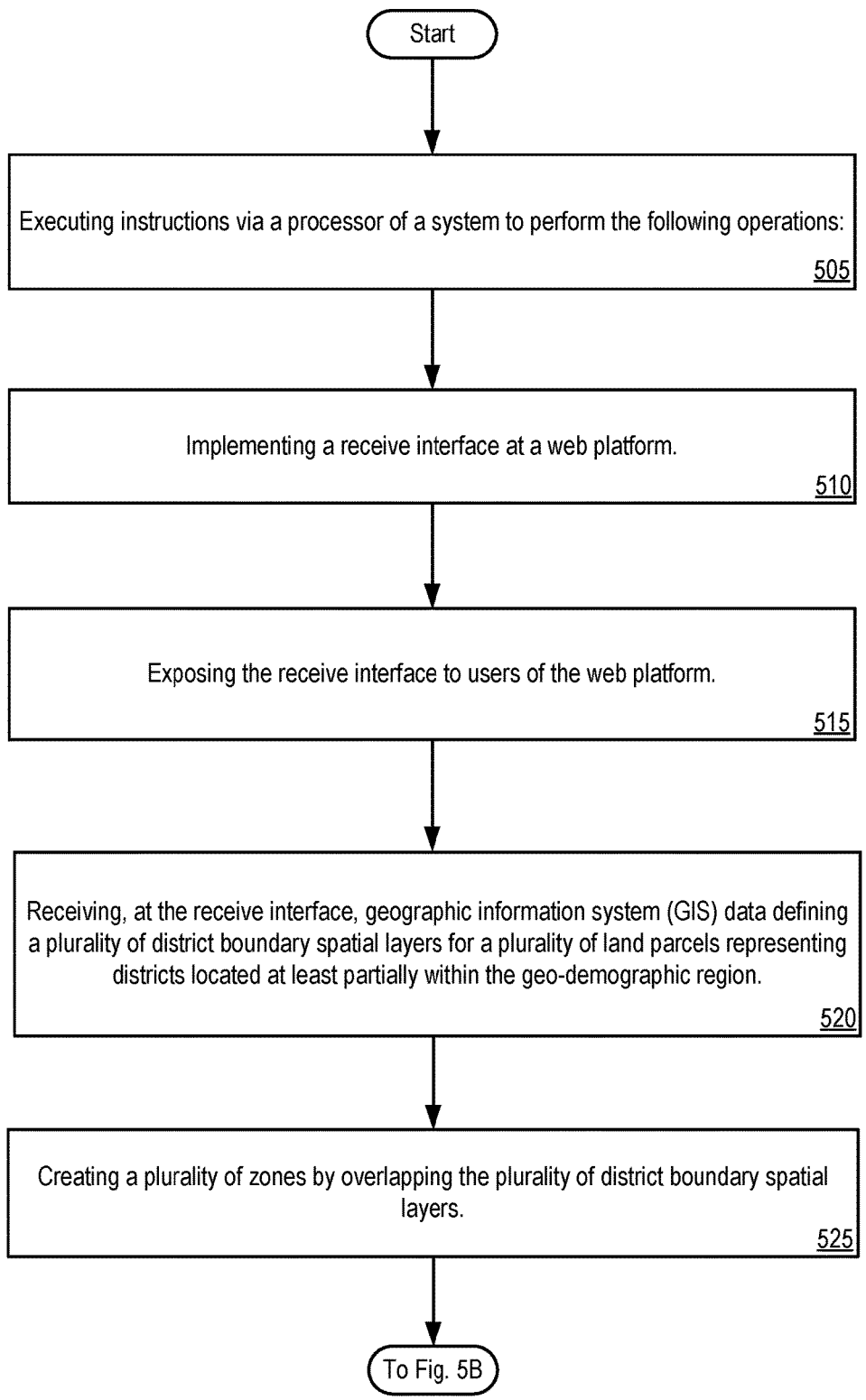
FIGS. 5A and 5B depict a flow diagram illustrating a method for implementing a geo-demographic zoning optimization engine for mapping within a computing environment such as a database system implementation supported by a processor and a memory to execute such functionality to provide cloud-based on-demand functionality to users, customers, and subscribers.
Figure 5B:
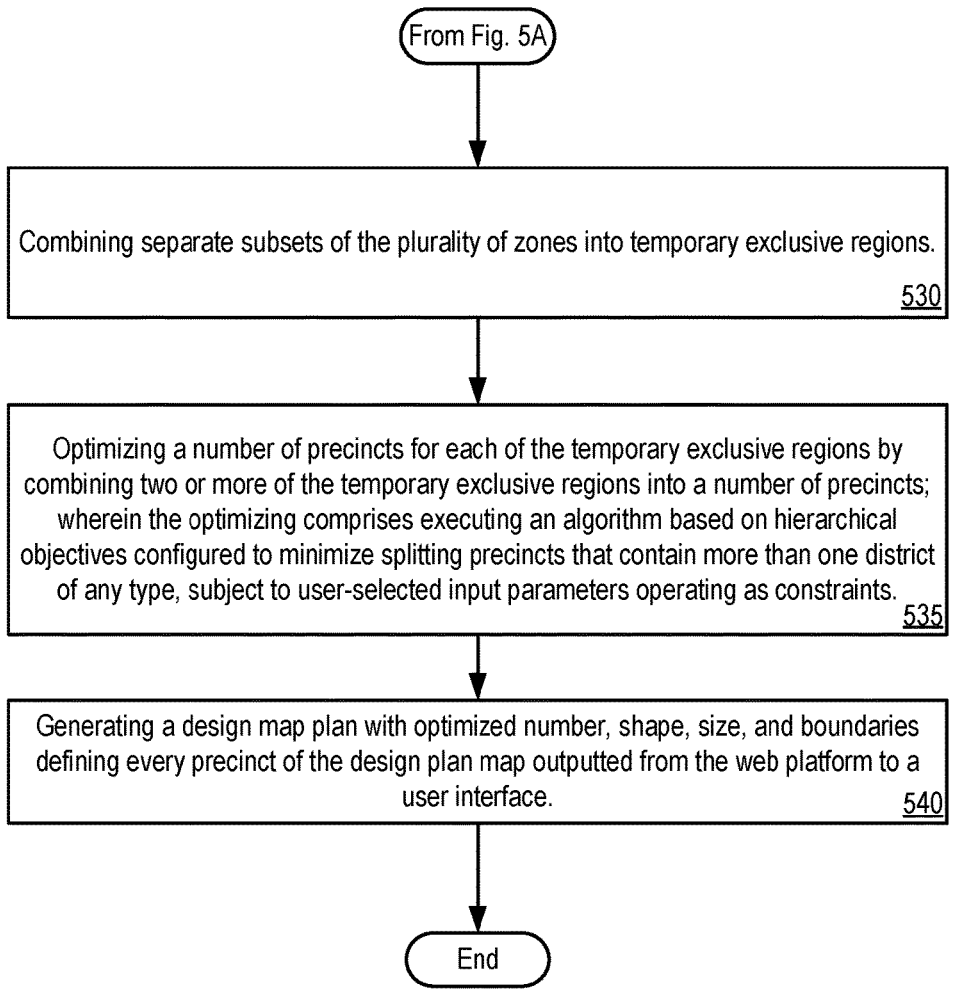

FIGS. 5A and 5B depict a flow diagram illustrating a method 500-501 for implementing a geo-demographic zoning optimization engine for mapping within a computing environment such as a database system implementation supported by a processor and a memory to execute such functionality to provide cloud-based on-demand functionality to users, customers, and subscribers.

Figure 6:
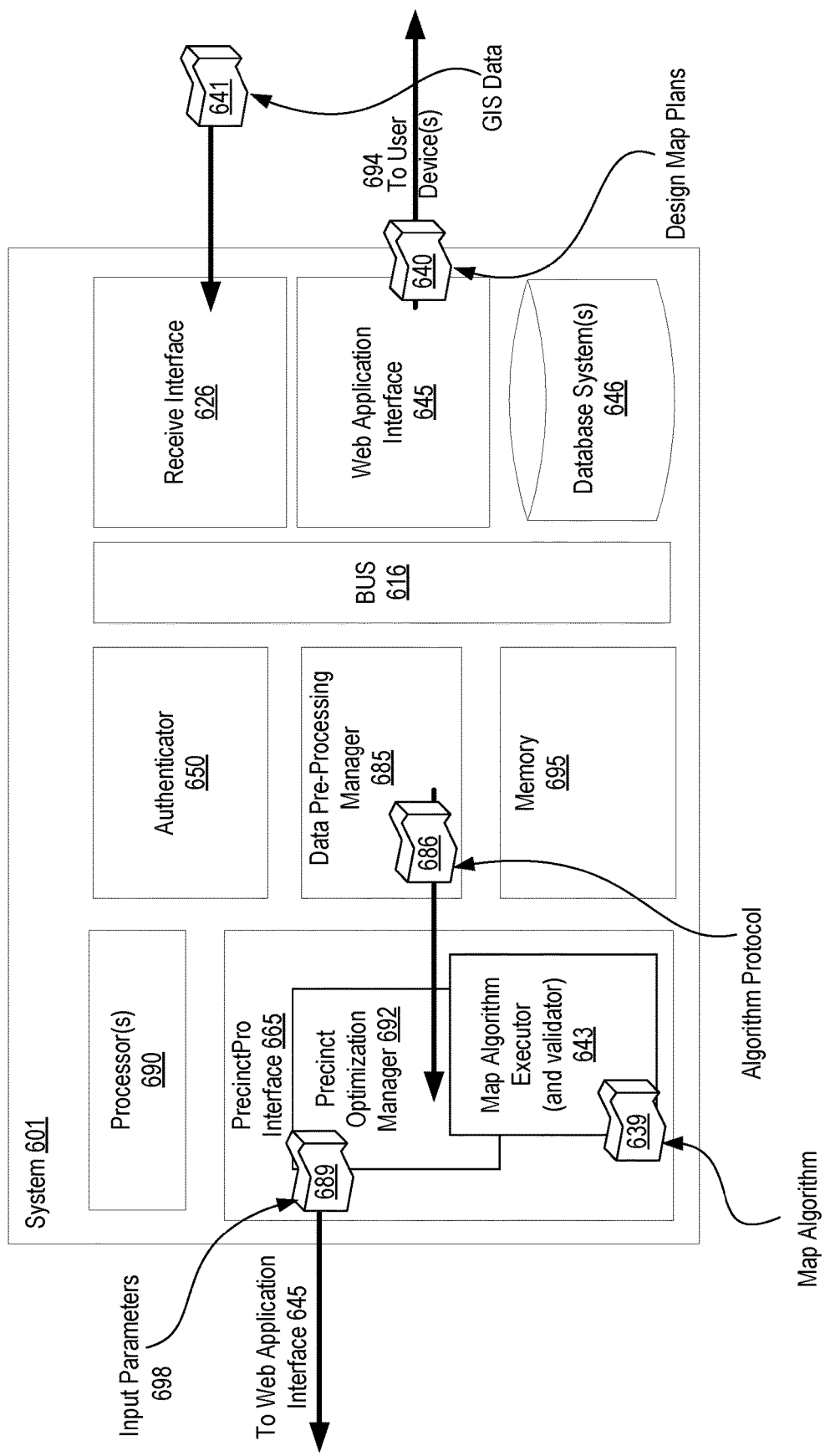
FIG. 6 shows a diagrammatic representation of a system within which embodiments may operate, be installed, integrated, or configured.

Method 500-501 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, system 601 and database system 646 as depicted at FIG. 6, as well as other complementary systems may operate in collaboration to implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to method 500-501 depicted at FIG. 5A, at block 505, processing begins by executing instructions via a processor of a system to perform the following operations:

At block 510, processing logic implements a receive interface at a web platform.

At block 515, processing exposes the receive interface to users of the web platform.

At block 520, processing logic receives, at the receive interface, geographic information system (GIS) data defining a plurality of district boundary spatial layers for a plurality of land parcels representing located at least partially within the geo-demographic region.

At block 525, processing logic creates a plurality of zones by overlapping the plurality of district boundary spatial layers.

Method 500-501 continues at FIG. 5B.

At block 530, processing logic combines separate subsets of the plurality of zones into temporary exclusive regions.

At block 535, processing logic optimizes a number of precincts for each of the temporary exclusive regions by combining two or more of the temporary exclusive regions into a number of precincts; in which the optimizing comprises executing an algorithm based on hierarchical objectives configured to minimize splitting precincts that contain more than one district of any type, subject to user-selected input parameters operating as constraints.

At block 540, processing logic generates a design plan map with optimized number, shape, size, and boundaries defining every precinct of the design plan map outputted from the web platform to a user interface.

According to another embodiment of method 500-501, each district boundary spatial layer is a contiguous group of land parcels that belong to at most a single voting district for all possible types of voting districts in the geo-demographic region.

According to another embodiment of method 500-501, the district boundary spatial layers correspond to a plurality of types of voting districts within the geo-demographic region.

According to another embodiment of method 500-501, each temporary exclusive region belongs to at most a single exclusive voting district in the geo-demographic region.

According to another embodiment of method 500-501, hierarchical objectives for optimization include having one or more of: (i) a minimum number of voting precincts i ($p_i^{min}$) for each temporary exclusive region i, (ii) a maximum number of voters $m_{max}$, in each temporary exclusive region, and (ii) a maximum number of non-permanent early voting list (non-PEVL) voters $n_{max}$ in each temporary exclusive region.

According to another embodiment of method 500-501, user-selected input parameters includes one or more of: (i) boundary spatial layers and other GIS data, (ii) specifying a minimum number of voters $m_{min}$, in each temporary exclusive region, (iii) specifying a maximum number of voters $m_{max}$, in each temporary exclusive region, (iv) specifying a maximum number of non-permanent early voting list (non-PEVL) voters $n_{max}$ in each temporary exclusive region, (v) specifying whether district boundary spatial layers must be split ("optional no-split" or "no-cross" layers), may not be split ("mandatory non-split" layers), or may be split ("other/sharing allowed" layers); (vi) specifying weights for precinct compactness, and (vii) specifying weights for district boundary spatial layers that must be split ("optional no-crossing splits").

According to another embodiment of method 500-501, the generated optimized number of precincts may be edited at the user interface to perform one or more of: (i) creating new precincts from existing precincts, (iii) adding new precincts, and (iii) re-optimizing precincts.

According to another embodiment, method 500-501 further includes: calculating a minimum number of voting precincts for each temporary exclusive region based on a total number of voters, a total number of non-permanent early voting list voters, a maximum number of voters, and a maximum number of non-permanent early voting list voters; and optimizing the number of voting precincts for each temporary exclusive region based on the calculated minimum number of voting precincts for each temporary exclusive region.

According to another embodiment of method 500-501, the method further includes calculating a minimum number of voting precincts for each temporary exclusive region. According to such an embodiment, optimizing the number of voting precincts for each temporary exclusive region is further based on the calculated minimum number of voting precincts for each temporary exclusive region.

According to another embodiment of method 500-501, each temporary exclusive region is designated as i, and for each temporary exclusive region: the total number of voters is designated as $M_i$, the total number of non-permanent early voting list voters is designated as $N_i$, the maximum number of voters is designated as $m_{max}$, the maximum number of non-permanent early voting list voters is designated as $n_{max}$, and the minimum number of voting precincts for each temporary exclusive region is designated as $i(p_i^{min})$. According to such an embodiment, the minimum number of voting precincts for each temporary exclusive region is calculated according to the equation:

$$p_i^{min} = \left[\max\left(\frac{M_i}{m_{max}}, \frac{N_i}{n_{max}}\right)\right].$$

According to another embodiment of method 500-501, optimizing a number of precincts for each of the temporary exclusive regions further includes: (i) minimizing the total number of precincts, wherein minimizing the total number of precincts reduces a number of different versions of ballots of be printed and other costs associated with printing ballots, (ii) minimizing total voter-weighted travel distance within precincts, wherein minimizing total voter-weighted travel distance within precincts creates a smaller and more compact precincts and provides greater access to voting, and (iii) minimizing the number of splits in precincts containing more than one district of any type that may be divided.

According to another embodiment of method 500-501; combining the separate subsets of the plurality of zones into the temporary exclusive regions includes each of the temporary exclusive regions being allocated to at most a single exclusive voting district by combining separate subsets of the plurality of zones into respective temporary exclusive regions, each of which belong to at most one of a single required-exclusive district and one of a single user-defined-exclusive district within the geo-demographic region.

According to another embodiment of method 500-501, combining two or more zones in the respective separate subset of the plurality of zones for each temporary exclusive region into a number of voting precincts includes combining two or more zones in the respective separate subset of the plurality of zones for each temporary exclusive region into a number of contiguous voting precincts.

According to another embodiment of method 500-501, combining two or more zones in the respective separate subset of the plurality of zones for each temporary exclusive region into the number of voting precincts includes combining two or more zones in the respective separate subset of the plurality of zones for each temporary exclusive region into a number of voting precincts that minimizes a number of non-exclusive voting districts in the temporary exclusive region.

According to another embodiment of method 500-501, combining two or more zones in the respective separate subset of the plurality of zones for each temporary exclusive region into the number of voting precincts includes combining two or more zones in the respective separate subset of the plurality of zones for each temporary exclusive region into a number of voting precincts that maximizes a compactness of each voting precinct in the temporary exclusive region.

In accordance with a particular embodiment of method 700-701, there is a non-transitory computer readable storage medium having instructions stored thereupon that, when executed by a host organization having at least a processor and a memory therein, the instructions cause the processor to perform operations including: executing instructions via the processor to implement a receive interface at the web platform; exposing the receive interface to users of the web platform; receiving, at the receive interface, geographic information system (GIS) data defining a plurality of district boundary spatial layers for a plurality of land parcels representing districts located at least partially within the geo-demographic region; creating a plurality of zones by overlapping the plurality of district boundary spatial layers; combining separate subsets of the plurality of zones into temporary exclusive regions; optimizing a number of precincts for each of the temporary exclusive regions by combining two or more of the temporary exclusive regions into a number of precincts; in which the optimizing includes executing an algorithm based on hierarchical objectives configured to minimize splitting precincts that contain more than one district of any type, subject to user-selected input parameters operating as constraints; and generating as output from the web platform a design plan map with the optimized number of precincts at a user interface.

FIG. 6 shows a diagrammatic representation of a system 601 within which embodiments may operate, be installed, integrated, or configured.

In accordance with one embodiment, there is a system 601 having at least a processor 690 and a memory 695 therein to execute implementing application code for the methodologies as described herein. Such a system 601 may communicatively interface with and cooperatively execute with the benefit of a hosted computing environment, such as a host organization, a multi-tenant environment, an on-demand service provider, a cloud-based service provider, a client-server environment, etc.

According to the depicted embodiment, system 601, which may operate within a host organization, includes the processor 690 and the memory 695 to execute instructions at the system 601. According to such an embodiment, the processor 690 is to execute a geo-demographic zoning optimization engine for mapping. Internal to the PrecinctPro interface 665, there is depicted the precinct optimization manager 692.

As shown here, the precinct optimization manager 692 is capable of receiving and applying user input parameter 698 in the generation of design plan maps 640. According to certain embodiments, user input parameters 698 may include user input 371 including mandatory layers 372, optional layers 373, and minimum and maximum voters 374, as well as objectives and constraints 376. User input parameter 698 may also include election official inputs 307 such as boundary spatial layers 308 and voter location(s) 309.

A receive interface 626 of the system 601 is to receive GIS data 641 which will be sent to authenticator 650 for authentication. According to certain embodiments, GIS data 641 may include all voting district layers 370, for example, in the form of uploaded shape files 306.

At this point, the received GIS data 641 may be pre-processed via data pre-processing manager 685. Data pre-processing 310 operations may include, for example, identifying all districts from the received GIS data 641 and creating No-Split Zones (NSZs) from the received GIS data 641 by overlaying various district shapefiles as described in FIGS. 4A-4C.

Bus 616 interfaces the various components of the system 601 amongst each other, with any other peripheral(s) of the system 601, and with external components such as external network elements, other machines, client devices, cloud computing services, etc. Communications may further include communicating with external devices via a network interface over a LAN, WAN, or the public Internet. Authenticator 650 provides authentication services for users seeking access to the database systems 646. According to certain embodiments, authenticator 650 may authenticate the received GIS data 641, for example in coordination with data pre-processing manager 685.

According to certain embodiments, receive interface 626 of the system may receive receiving input, including received GIS data 641 to be mapped via data pre-processing manager 685 and optimized via precinct optimization manager 692. Map algorithm executor (and validator) 643 executes map algorithm 639 in accordance with algorithm protocol 686 and operations described in FIG. 3C in order to optimize precinct mapping. According to certain embodiments, map algorithm 639 is to generate optimized design plan maps 640 and push them to web application interface 645 for transmission to user device(s) 694 communicably interfaced with the system 601 over a network for display.

According to an exemplary embodiment, there is a system 601 executing at a web platform such as web application interface 645, in which the system 601 includes: a memory 695 to store instructions; a set of one or more processors 690; a non-transitory machine-readable storage medium that provides instructions that, when executed by the set of one or more processors, the instructions stored in the memory are configurable to cause the system to perform operations for designing sectioned mappings for a geo-demographic region, the operations including: executing instructions via the processor 690 to implement a receive interface 626 at the web platform; exposing the receive interface 626 to users of the web platform; receiving, at the receive interface 626, geographic information system (GIS) data 641 defining a plurality of district boundary spatial layers for a plurality of land parcels representing districts located at least partially within the geo-demographic region; creating a plurality of zones by overlapping the plurality of boundary spatial layers; combining separate subsets of the plurality of zones into temporary exclusive regions; optimizing a number of precincts for each of the temporary exclusive regions by combining two or more of the temporary exclusive regions into a number of precincts; in which the optimizing comprises executing an algorithm 439 based on hierarchical objectives configured to minimize splitting precincts that contain more than one district of any type, subject to user-selected input parameters 698 operating as constraints; and generating a design plan map 640 with optimized number, shape, size, and boundaries defining every precinct of the design plan map outputted from the web platform to a user interface 645.

FIG. 7 illustrates a diagrammatic representation of a machine 700 in the exemplary form of a computer system, in accordance with one embodiment, within which a set of instructions for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, or as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a precinct optimization engine 724, data pre-processor 723, and zone generator 725, which generates mapping from user inputs such as GIS data 315.

Data pre-processor 723 may execute operations including, for example, identifying all districts from the received GIS data 641 and, via zone generator 725 creating No-Split Zones (NSZs) from the received GIS data 641 by overlaying various district shapefiles as described in FIGS. 4A-4C.

Precinct optimization engine 724 optimizes zones NSZs generated from zone generator 725 and executes map algorithm 639 in accordance with algorithm protocol 686 and operations described in FIG. 3C in order to optimize precinct mapping.

Main memory 704 and its sub-elements are operable in conjunction with processing logic 726 and processor 702 to perform the methodologies discussed herein. Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application-specific integrated circuit (ASIC), a field-programmable gate array (FPGA), a digital signal processor (DSP), network processor, or the like. Processor 702 is configured to execute the processing logic 726 for performing the operations and functionality discussed herein.

The computer system 700 may further include a network interface card 708. The computer system 700 also may include a user interface 710 (such as a video display unit, a liquid crystal display, etc.), an alphanumeric input device 712 (e.g., a keyboard), a cursor control device 1013 (e.g., a mouse), and a signal generation device 716 (e.g., an integrated speaker). The computer system 700 may further include peripheral device 1036 (e.g., wireless or wired communication devices, memory devices, storage devices, audio processing devices, video processing devices, etc.). According to certain embodiments, user interface 710 may be a web application interface such as web application interface 645 displaying precinct design plan maps 640 at a user device such as user device(s) 694.

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, with the main memory 704 and the processor 702 also constituting machine-readable storage media. The software 722 may further be transmitted or received over a network 720 via the network.

While the subject matter disclosed herein has been described by way of example and in terms of the specific embodiments, it is to be understood that the claimed embodiments are not limited to the explicitly enumerated embodiments disclosed. On the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system executing at a web platform, wherein the system comprises:
   a memory to store instructions;
   a set of one or more processors;
   a non-transitory machine-readable storage medium that provides instructions that, when executed by the set of one or more processors, the instructions stored in the memory are configurable to cause the system to perform operations for designing sectioned mappings for a geo-demographic region, the operations comprising:
   executing instructions via the processor to implement a receive interface at the web platform;
   exposing the receive interface to users of the web platform;
   querying a database system communicably interfaced with the system for geographic information system (GIS) data;
   receiving, at the receive interface of the system, the GIS data defining district boundary spatial layers for a plurality of land parcels representing districts located at least partially within the geo-demographic region;
   creating a plurality of zones by overlapping the district boundary spatial layers;
   combining separate subsets of the plurality of zones into temporary exclusive regions;
   optimizing a number of precincts for each of the temporary exclusive regions by combining two or more of the temporary exclusive regions into a number of precincts;
   wherein the optimizing comprises systematically validating the precincts subject to user-specified constraints requiring that each of the precincts is spatially contiguous, that user-specified mandatory no-split spatial districts are not divided within any of the precincts, and that a total number of voters in any of the precincts does not exceed a specified maximum; and
   generating a design plan map subject to the optimizing and systematic validation, providing boundaries defining every precinct of the design plan map as output from the web platform to a user interface.

2. The system of claim 1, wherein each district boundary spatial layer is a contiguous group of land parcels that belong to at most a single voting district for all possible types of voting districts in the geo-demographic region.

3. The system of claim 1, wherein the district boundary spatial layers correspond to a plurality of types of voting districts within the geo-demographic region.

4. The system of claim 1, wherein each temporary exclusive region belongs to at most a single exclusive voting district in the geo-demographic region.

5. The system of claim 1, wherein hierarchical objectives for optimization include having one or more of:
   (i) a minimum number of voting precincts i ($p_i^{min}$) for each temporary exclusive region i,
   (ii) a maximum number of voters $m_{max}$, in each temporary exclusive region, and
   (iii) a maximum number of non-permanent early voting list (non-PEVL) voters $n_{max}$ in each temporary exclusive region.

6. The system of claim 1, wherein optimizing a number of precincts for each of the temporary exclusive regions further comprises:
   (i) minimizing the total number of precincts, wherein minimizing the total number of precincts reduces a number of different versions of ballots of be printed and other costs associated with printing ballots,
   (ii) minimizing total voter-weighted travel distance within precincts, wherein minimizing total voter-weighted travel distance within precincts creates a smaller and more compact precincts and provides greater access to voting, and
   (iii) minimizing the number of splits in precincts containing more than one district of any type that may be divided.

7. The system of claim 1, wherein user-selected input parameters includes one or more of:

(i) district boundary spatial layers and other GIS data, (ii) specifying a minimum number of voters $m_{min}$, in each temporary exclusive region, (iii) specifying a maximum number of voters $m_{max}$, in each temporary exclusive region, (iv) specifying a maximum number of non-permanent early voting list (non-PEVL) voters $n_{max}$ in each temporary exclusive region, (v) specifying whether district boundary spatial layers must be split ("optional no-split" or "no-cross" layers), may not be split ("mandatory non-split" layers), or may be split ("other/sharing allowed" layers);

(vi) specifying weights for precinct compactness, and (vii) specifying weights for district boundary spatial layers that must be split ("optional no-crossing splits").

8. The system of claim 1, wherein the generated optimized number of precincts may be edited at the user interface to perform one or more of: (i) creating new precincts from existing precincts, (ii) adding new precincts, and (iii) re-optimizing precincts.

9. The system of claim 1, further comprising:
calculating a minimum number of voting precincts for each temporary exclusive region based on a total number of voters, a total number of non-permanent early voting list voters, a maximum number of voters, and a maximum number of non-permanent early voting list voters; and
optimizing the number of voting precincts for each temporary exclusive region based on the calculated minimum number of voting precincts for each temporary exclusive region.

10. The system of claim 1:
wherein the method further comprises calculating a minimum number of voting precincts for each temporary exclusive region; and
wherein optimizing the number of voting precincts for each temporary exclusive region is further based on the calculated minimum number of voting precincts for each temporary exclusive region.

11. The system of claim 10, wherein each temporary exclusive region is designated as i, wherein for each temporary exclusive region:
the total number of voters is designated as $M_i$,
the total number of non-permanent early voting list voters is designated as $N_i$,
the maximum number of voters is designated as $m_{max}$,
the maximum number of non-permanent early voting list voters is designated as $m_{max}$, and
the minimum number of voting precincts for each temporary exclusive region is designated as i ($p_i^{min}$); and
wherein the minimum number of voting precincts for each temporary exclusive region is calculated according to the equation:

$$p_i^{min} = \left\lceil \max\left(\frac{M_i}{m_{max}}, \frac{N_i}{n_{max}}\right)\right\rceil.$$

12. The system of claim 1, wherein combining the separate subsets of the plurality of zones into the temporary exclusive regions comprises each of the temporary exclusive regions being allocated to at most a single exclusive voting district by combining separate subsets of the plurality of zones into respective temporary exclusive regions, each of which belong to at most one of a single required-exclusive district and one of a single user-defined-exclusive district within the geo-demographic region.

13. The system of claim 1, wherein combining two or more zones in the respective separate subset of the plurality of zones for each temporary exclusive region into a number of voting precincts comprises combining two or more zones in the respective separate subset of the plurality of zones for each temporary exclusive region into a number of contiguous voting precincts.

14. The system of claim 13, wherein combining two or more zones in the respective separate subset of the plurality of zones for each temporary exclusive region into the number of voting precincts comprises combining two or more zones in the respective separate subset of the plurality of zones for each temporary exclusive region into a number of voting precincts that minimizes a number of non-exclusive voting districts in the temporary exclusive region.

15. The system of claim 13, wherein combining two or more zones in the respective separate subset of the plurality of zones for each temporary exclusive region into the number of voting precincts comprises combining two or more zones in the respective separate subset of the plurality of zones for each temporary exclusive region into a number of voting precincts that maximizes a compactness of each voting precinct in the temporary exclusive region.

16. Non-transitory computer readable storage media having instructions stored thereupon that, when executed by a processor of a computer system executing at a web platform, the instructions cause the computer system to perform operations including:
executing instructions via the processor to implement a receive interface at the web platform;
exposing the receive interface to users of the web platform;
querying a database system communicably interfaced with the system for geographic information system (GIS) data;
receiving, at the receive interface of the system, the GIS data defining district boundary spatial layers for a plurality of land parcels representing districts located at least partially within the geo-demographic region;
creating a plurality of zones by overlapping the district boundary spatial layers;
combining separate subsets of the plurality of zones into temporary exclusive regions;
optimizing a number of precincts for each of the temporary exclusive regions by combining two or more of the temporary exclusive regions into a number of precincts;
wherein the optimizing comprises systematically validating the precincts subject to user-specified constraints requiring that each of the precincts is spatially contiguous, that user-specified mandatory no-split spatial districts are not divided within any of the precincts, and that a total number of voters in any of the precincts does not exceed a specified maximum; and
generating a design plan map subject to the optimizing and systematic validation, providing boundaries defining every precinct of the design plan map as output from the web platform to a user interface.

17. The non-transitory computer readable storage media of claim 16:
wherein each district boundary spatial layer is a contiguous group of land parcels that belong to at most a single voting district for all possible types of voting districts in the geo-demographic region;

wherein the district boundary spatial layers correspond to a plurality of types of voting districts within the geo-demographic region; and wherein each temporary exclusive region belongs to at most a single exclusive voting district in the geo-demographic region.

18. The non-transitory computer readable storage media of claim 16, wherein hierarchical objectives for optimization include having one or more of:
   (i) a minimum number of voting precincts i ($p_i^{min}$) for each temporary exclusive region i,
   (ii) a maximum number of voters $m_{max}$, in each temporary exclusive region, and
   (iii) a maximum number of non-permanent early voting list (non-PEVL) voters $n_{max}$ in each temporary exclusive region.

19. A computer implemented method performed by a system of a web platform having at least a processor and a memory therein to execute instructions for designing sectioned mappings for a geo-demographic region, wherein the method comprises:
   executing instructions via the processor to implement a receive interface at the web platform;
   exposing the receive interface to users of the web platform;
   querying a database system communicably interfaced with the system for geographic information system (GIS) data;
   receiving, at the receive interface of the system, the GIS data defining district boundary spatial layers for a plurality of land parcels representing districts located at least partially within the geo-demographic region;
   creating a plurality of zones by overlapping the district boundary spatial layers;
   combining separate subsets of the plurality of zones into temporary exclusive regions;
   optimizing a number of precincts for each of the temporary exclusive regions by combining two or more of the temporary exclusive regions into a number of precincts;
   wherein the optimizing comprises systematically validating the precincts subject to user-specified constraints requiring that each of the precincts is spatially contiguous, that user-specified mandatory no-split spatial districts are not divided within any of the precincts, and that a total number of voters in any of the precincts does not exceed a specified maximum; and
   generating a design plan map subject to the optimizing and systematic validation, providing boundaries defining every precinct of the design plan map as output from the web platform to a user interface.

20. The computer implemented method of claim 19:
   wherein each district boundary spatial layer is a contiguous group of land parcels that belong to at most a single voting district for all possible types of voting districts in the geo-demographic region;
   wherein the district boundary spatial layers correspond to a plurality of types of voting districts within the geo-demographic region; and
   wherein each temporary exclusive region belongs to at most a single exclusive voting district in the geo-demographic region.

* * * * *